United States Patent
Pedersen

(10) Patent No.: US 11,390,365 B2
(45) Date of Patent: Jul. 19, 2022

(54) THRUSTER ELECTRIC POWER SYSTEMS AND ASSOCIATED METHODS

(71) Applicant: MAERSK DRILLING A/S, Kgs. Lyngby (DK)

(72) Inventor: John Røn Pedersen, Frederikssund (DK)

(73) Assignee: MAERSK DRILLING A/S, Kgs. Lyngby (DK)

(*) Notice: Subject to any disclaimer, the term of this patent is extended or adjusted under 35 U.S.C. 154(b) by 453 days.

(21) Appl. No.: 16/606,693

(22) PCT Filed: Apr. 18, 2018

(86) PCT No.: PCT/DK2018/000011
§ 371 (c)(1),
(2) Date: Oct. 18, 2019

(87) PCT Pub. No.: WO2018/192632
PCT Pub. Date: Oct. 25, 2018

(65) Prior Publication Data
US 2021/0107616 A1    Apr. 15, 2021

Related U.S. Application Data

(60) Provisional application No. 62/486,915, filed on Apr. 18, 2017.

(30) Foreign Application Priority Data

Apr. 19, 2017 (DK) .......................... PA 2017 00257
Jun. 11, 2017 (DK) .......................... PA 2017 00345

(51) Int. Cl.
*B63H 21/17* (2006.01)
*E21B 41/00* (2006.01)
(Continued)

(52) U.S. Cl.
CPC ................ *B63H 21/17* (2013.01); *B63J 3/04* (2013.01); *E21B 41/0007* (2013.01); *H02J 3/381* (2013.01); *B63J 2003/002* (2013.01)

(58) Field of Classification Search
CPC ....... B63H 21/17; B63J 3/04; B63J 2003/002; B63J 3/00; E21B 41/0007; E21B 41/00; H02J 3/381; H02J 3/38
See application file for complete search history.

(56) References Cited

U.S. PATENT DOCUMENTS

2007/0077830 A1    4/2007 Rzadki et al.
2012/0292992 A1    11/2012 Williams
(Continued)

FOREIGN PATENT DOCUMENTS

CA    2977186    8/2016
EP    2799328    11/2014
(Continued)

OTHER PUBLICATIONS

Danish Patent Application No. PA 2021 00608; Search Report and Opinion dated Sep. 7, 2021; 6 pages.
(Continued)

*Primary Examiner* — Robert L Deberadinis
(74) *Attorney, Agent, or Firm* — Lathrop GPM LLP

(57) ABSTRACT

A thruster electric power system includes one or more energy storage units configured to power an electric thruster of a mobile offshore drilling unit in response to one or more combustion generators of the mobile offshore drilling unit being unavailable to provide electric power to the electric thruster. A mobile offshore drilling unit capable of dynamic positioning includes one or more thruster enclosures, each thruster enclosure including: (a) one or more thruster converters configured to power respective electric thrusters, and (b) one or more energy storage units configured to power the (Continued)

respective electric thrusters of the one or more thruster converters in response to one or more combustion generators of the mobile offshore drilling unit being unavailable to provide electric power to the electric thrusters.

15 Claims, 16 Drawing Sheets

(51) Int. Cl.
   *H02J 3/38* (2006.01)
   *B63J 3/04* (2006.01)
   *B63J 3/00* (2006.01)

(56) References Cited

U.S. PATENT DOCUMENTS

| | | |
|---|---|---|
| 2013/0029543 A1 | 1/2013 | Gjerpe |
| 2013/0270902 A1 | 10/2013 | Andersen et al. |
| 2013/0271083 A1 | 10/2013 | Williams |
| 2013/0307444 A1 | 11/2013 | Settemsdal |
| 2013/0313894 A1 | 11/2013 | Settemsdal |
| 2016/0009354 A1 | 1/2016 | Lai et al. |

FOREIGN PATENT DOCUMENTS

| | | |
|---|---|---|
| EP | 2916419 | 9/2015 |
| WO | WO 2011/028895 | 3/2011 |
| WO | WO 2016/116595 | 7/2016 |
| WO | WO 2016/131460 | 8/2016 |

OTHER PUBLICATIONS

International Patent Application No. PCT/DK2018/000011, International Search Report and Written Opinion dated Jul. 13, 2018, 13 pgs.

Ekstrom et al. (2013), "Transformers Magnetizing Inrush Currents Using a Directly Coupled Voltage-Source Inverter", ISRN Electronics, Jan. 31, 2013, pp. 1-8.

Danish Patent Application No. PA 2017 00257; Examination Report dated Oct. 11, 2017; 9 pgs.

Danish Patent Application No. PA 2017 00345; Examination Report dated Nov. 6, 2017; 9 pgs.

THRUSTER ELECTRIC POWER SYSTEMS AND ASSOCIATED METHODS

CROSS-REFERENCE TO RELATED APPLICATIONS

This application is a 35 U.S.C. § 371 filing of International Application No. PCT/DK2018/000011 filed Apr. 18, 2018, which claims the benefit of priority to U.S. Provisional Application No. 62/486,915, filed Apr. 18, 2017, Danish Patent Application No. PA 2017 00257 filed Apr. 19, 2017, and Danish Patent Application No. PA 2017 00345, filed Jun. 11, 2017, each of which is incorporated herein by reference in its entirety.

BACKGROUND

An offshore drilling rig (also referred to as mobile offshore drilling unit (MODU)) typically includes a self-contained electric power system, often referred to as a "microgrid," to power a variety of electric loads on the drilling rig. Examples of such loads include drawworks, winches, hydraulic power units (HPUs), electric thrusters, mud pumps, top drives, rotary tables, dynamic braking systems, cement pumps, cranes and peripheral electrical loads. Some of these electric loads are relatively constant. For example, lighting, HVAC (heating, ventilation and air conditioning), pumps, agitators, mixers, and air compressors commonly present a base load of approximately one to five megawatts (MW). Mud pumps, top drives, and rotary tables may also present a relatively constant electric load.

On the other hand, some significant electric loads on an offshore drilling rig may be very dynamic. For instance, drawworks, winches, thrusters, cranes and HPUs present highly variable loads with peak power demands that are, for example, two to three times larger than typical base loads. As one particular example, some drawworks have a load requirement that can vary by up to ten MW in less than twenty seconds and that can ramp up from zero to about seven MW in less than two seconds. As another example, each thruster on a drilling rig may represent a maximum load of around five MW, and a typical drilling rig may have six to eight thrusters, resulting in a total thruster maximum load of over thirty MW. Each thruster may ramp up to its maximum load in approximately ten to twenty seconds, and multiple thrusters may be activated at once. Thrusters may therefore present a very large transient load on a drilling rig. Consequentially, an offshore drilling rig's microgrid must support significant transient, as well as steady-state, electric loads. Additionally, an offshore drilling rig's microgrid must be highly reliable since an electric power failure or "blackout" may have catastrophic consequences, including loss of life, significant environmental damage, and large economic loss.

SUMMARY

In an embodiment, a thruster electric power system includes (a) a thruster direct current (DC) electric power bus, (b) one or more thruster direct current to alternating current (DC-to-AC) converters configured to electrically couple a respective electric thruster to the thruster DC electric power bus, and (c) one or more energy storage units electrically coupled to the thruster DC electric power bus.

In an embodiment, a respective electric thruster is electrically coupled to each of the one or more thruster DC-to-AC converters.

In an embodiment, the thruster electric power system further includes (a) a first transformer electrically coupled to a first alternating current (AC) electric power bus and (b) an alternating current to direct current (AC-to-DC) converter electrically coupled between the transformer and the thruster DC electric power bus.

In an embodiment, at least one combustion generator is electrically coupled to the first AC electric power bus.

In an embodiment, the thruster electric power system further includes (a) an auxiliary AC electric power bus, (b) an auxiliary DC-to-AC converter electrically coupling the thruster DC electric power bus to the auxiliary AC electric power bus, and (c) a second transformer electrically coupling the auxiliary AC electric power bus to the first AC electric power bus.

In an embodiment, one or more auxiliary electric loads are electrically coupled to the auxiliary AC electric power bus.

In an embodiment, the one or more auxiliary electric loads include one or more of an oil pump, a cooling pump, and a hydraulic power unit.

In an embodiment, the one or more energy storage units include one or more kinetic generators.

In an embodiment, the one or more energy storage units include at least one of a battery storage subsystem and a supercapacitor.

In an embodiment, the one or more thruster DC-to-AC converters consist of a single thruster DC-to-AC converter.

In an embodiment, the one or more thruster DC-to-AC converters include a plurality of thruster DC-to-AC converters.

In an embodiment, each of the one or more energy storage units is capable of providing a power output to allow thruster operation at sufficient power and for a sufficient period of time to allow an emergency procedure to be performed and/or for power to be reinstated, such as a power output of at least 2.5 megawatts for 120 seconds.

In an embodiment, a mobile offshore drilling unit includes one or more of the thruster electric power systems.

In an embodiment, the mobile offshore drilling unit further includes a plurality of the thruster electric power systems.

In an embodiment, a method for powering one or more electric thrusters of a mobile offshore drilling unit includes (a) powering a thruster direct current (DC) electric power bus from a first alternating current (AC) electric power bus, (b) in response to a power failure, powering the thruster DC electric power bus from one or more energy storage units electrically coupled to the thruster DC electric power bus, and (c) powering a first electric thruster from the thruster DC electric power bus.

In an embodiment, the method further includes (a) powering an auxiliary AC electric power bus from the first AC electric power bus, (b) in response to the power failure, powering the auxiliary AC electric power bus from the thruster DC electric power bus, and (c) powering one or more auxiliary electric loads from the auxiliary AC electric power bus.

In an embodiment, the one or more auxiliary electric loads include one or more of an oil pump, a cooling pump, and a hydraulic power unit.

In an embodiment, the one or more energy storage units include one or more kinetic generators.

In an embodiment, the one or more energy storage units include at least one of a battery storage subsystem and a supercapacitor.

In an embodiment, the method further includes powering the thruster DC electric power bus from the one or more energy storage units for at least five minutes during the power failure.

In an embodiment, the method further includes powering a second electric thruster from the thruster DC electric power bus.

In an embodiment, the method further includes charging the one or more energy storage units from the thruster DC electric power bus.

In an embodiment, a method for operating a mobile offshore drilling unit in case of an emergency includes (a) powering one or more electric thrusters by one or more energy storage units, (b) powering one or more additional drilling equipment loads by one or more additional energy storage units, (c) at least partially performing station keeping using the one or more electric thrusters, and (d) disconnecting the mobile offshore drilling unit from a well being drilled by the mobile offshore drilling unit.

In an embodiment, a thruster electric power system includes one or more energy storage units configured to power an electric thruster of a mobile offshore drilling unit in response to one or more combustion generators of the mobile offshore drilling unit being unavailable to provide electric power to the electric thruster.

In an embodiment, the one or more energy storage units include one or more kinetic generators.

In an embodiment, the one or more energy storage units include at least one of a battery storage subsystem and a supercapacitor.

In an embodiment, the thruster electric power system includes a thruster electric power bus and a thruster converter electrically coupling the electric thruster to the thruster electric power bus.

In an embodiment, the thruster electric power system further includes an auxiliary electric power bus, wherein the one or more energy storage units are configured to power the auxiliary electric power bus in response to the one or more combustion generators being unavailable to provide electric power to the auxiliary electric power bus.

In an embodiment, one or more auxiliary electric loads are electrically coupled to the auxiliary electric power bus.

In an embodiment, the one or more auxiliary electric loads include one or more of an oil pump, a cooling pump, and a hydraulic power unit.

In an embodiment, at least the thruster electric power bus, the one or more energy storage units, the auxiliary electric power bus, and the thruster converter are housed in a common enclosure.

In an embodiment, at least the thruster electric power bus, the one or more energy storage units, and the thruster converter are housed in a common enclosure.

In an embodiment, the common enclosure does not contain a combustion generator.

In an embodiment, the common enclosure is located at a stern end of the mobile offshore drilling unit.

In an embodiment, the one or more energy storage units are electrically coupled to the thruster electric power bus.

In an embodiment, the one or more energy storage units are electrically coupled to the electric thruster.

In an embodiment, the thruster electric power system further includes an additional electric power bus and an interface device electrically coupling the additional electric power bus to the thruster electric power bus, where the one or more energy storage units are electrically coupled to the additional electric power bus.

In an embodiment, the additional electric power bus is a first alternating current (AC) electric power bus, and the interface device includes a first transformer electrically coupled between the first AC electric power bus and the thruster electric power bus.

In an embodiment, the thruster electric power bus is a thruster direct current (DC) electric power bus, and the thruster converter is a thruster direct current to alternating current (DC-to-AC) converter.

In an embodiment, a thruster electric power system includes (a) a thruster electric power bus, (b) an additional electric power bus, (c) an interface device electrically coupling the thruster electric power bus to the additional electric power bus, (d) a thruster converter electrically coupling an electric thruster to the thruster electric power bus, (e) an auxiliary electric power bus configured to receive electric power from the additional electric power bus, and (f) one or more energy storage units configured to power the electric thruster and the auxiliary electric power bus in response to one or more combustion generators of the mobile offshore drilling unit being unavailable to provide electric power to the electric thruster.

In an embodiment, the one or more energy storage units include one or more kinetic generators.

In an embodiment, the one or more energy storage units include at least one of a battery storage subsystem and a supercapacitor.

In an embodiment, the thruster electric power system further include a circuit breaker electrically coupling the additional electric power bus to a main electric power bus.

In an embodiment, at least one combustion generator is electrically coupled to the main electric power bus.

In an embodiment, one or more auxiliary electric loads are electrically coupled to the auxiliary electric power bus.

In an embodiment, the one or more auxiliary electric loads include one or more of an oil pump, a cooling pump, and a hydraulic power unit.

In an embodiment, at least the thruster electric power bus, the one or more energy storage units, the additional power bus, the auxiliary electric power bus, and the thruster converter are housed in a common enclosure.

In an embodiment, the common enclosure does not contain a combustion generator.

In an embodiment, the common enclosure is located at a stern end of the mobile offshore drilling unit.

In an embodiment, the interface device includes a first transformer, and the auxiliary electric power bus is electrically coupled to the additional electric power bus via the first transformer.

In an embodiment, the one or more energy storage units are electrically coupled to the thruster electric power bus.

In an embodiment, the one or more energy storage units are electrically coupled to the electric thruster.

In an embodiment, the one or more energy storage units are electrically coupled to the additional electric power bus.

In an embodiment, the additional electric power bus is a first alternating current (AC) electric power bus.

In an embodiment, the thruster electric power bus is a thruster direct current (DC) electric power bus, and the thruster converter is a thruster direct current to alternating current (DC-to-AC) converter.

In an embodiment, a mobile offshore drilling unit includes a thruster electric power system disclosed above.

In an embodiment, a mobile offshore drilling unit further includes a plurality of the thruster electric power systems disclosed above.

In an embodiment, the mobile offshore drilling unit further includes a power management system configured to control at least one or more combustion generators, wherein the thruster electric power system is configured to power the electric thruster independently of operation of the power management system.

In an embodiment, a mobile offshore drilling unit capable of dynamic positioning includes one or more thruster enclosures, each thruster enclosure including: (a) one or more thruster converters configured to power respective electric thrusters, and (b) one or more energy storage units configured to power the respective electric thrusters of the one or more thruster converters in response to one or more combustion generators of the mobile offshore drilling unit being unavailable to provide electric power to the electric thrusters.

In an embodiment, the mobile offshore drilling unit further includes a plurality of the one or more thruster enclosures.

In an embodiment, the one or more thruster enclosures are located at a stern end of the mobile offshore drilling unit.

In an embodiment, for each of the one or more thruster enclosures, the one or more energy storage units are configured to power the respective electric thrusters of the one or more thruster converters at at least thirty percent of a maximum power rating of the electric thrusters for least one minute.

In an embodiment, for each of the one or more thruster enclosures, the one or more energy storage units are configured to power the respective electric thrusters of the one or more thruster converters at at least forty percent of a maximum power rating of the electric thrusters for least five minutes.

In an embodiment, for each of the one or more thruster enclosures, the one or more energy storage units include at least one of a kinetic generator, a battery storage subsystem, and a supercapacitor.

In an embodiment, a method for powering one or more electric thrusters of a mobile offshore drilling unit includes using one or more energy storage units to power an electric thruster of a mobile offshore drilling unit in response to one or more combustion generators of the mobile offshore drilling unit being unavailable to provide electric power to the electric thruster.

In an embodiment, the method further includes powering the electric thruster at at least thirty percent of a maximum power rating of the electric thruster for least one minute.

In an embodiment, the method further includes powering the electric thruster at at least forty percent of a maximum power rating of the electric thruster for least five minutes.

In an embodiment, the method, further includes powering one or more auxiliary electric loads from the one or more energy storage units.

In an embodiment, the one or more auxiliary electric loads include one or more of an oil pump, a cooling pump, and a hydraulic power unit.

In an embodiment, the method further includes comprising pre-magnetizing a transformer using the one or more energy storage units before the transformer is electrically coupled to an electric power bus.

In an embodiment, the one or more energy storage units include one or more kinetic generators.

In an embodiment, the one or more energy storage units include at least one of a battery storage subsystem and a supercapacitor.

In an embodiment, the method further includes powering a second electric thruster from the one or more energy storage units.

DETAILED DESCRIPTION OF THE EMBODIMENTS

As discussed above, a mobile offshore drilling unit includes a number of electric thrusters to dynamically position the drilling unit, or in other words, to perform "station keeping" on the drilling unit. These thrusters are critical components because their failure may cause loss of ability to position the drilling unit, potentially resulting in catastrophic consequences, including loss of life, significant environmental damage, and large economic loss. Consequentially, reliable thruster operation is required.

Electric thruster reliability is conventionally achieved by dividing electric thrusters into pairs and separately electrically coupling each thruster pair to a respective combustion generator set (genset), where each combustion generator set is physically isolated from each other combustion generator set. For example, in some conventional systems including six electric thrusters, the electric thrusters are divided into three pairs, and each pair is electrically coupled to a respective combustion generator set, where each combustion generator set is physically disposed in a respective genset room. Consequently, failure of a single combustion generator set, such as from flooding of its respective genset room, disables only one pair of electric thrusters. The remaining electric thrusters must have significant excess capacity to adequately perform station keeping without assistance from the disabled pair. For example, in a conventional mobile offshore drilling unit including six electric thrusters, the electric thrusters must have sufficient excess capacity to achieve station keeping while only four of the six electric thrusters are operational.

Such large excess electric thruster capacity requirement increases electric thruster size and cost. Additionally, the fact that a single failure, such as flooding of a single genset room, may disable two electric thrusters necessitates complex testing to ensure that station keeping will be achieved in the event of a system failure.

Applicant has developed thruster electric power systems and associated methods which at least partially overcome one or more these problems associated with conventional systems. Certain embodiments help minimize the number of thrusters that are disabled in response to a single failure. For example, in some embodiments, a single failure will cause only a single electric thruster to be disabled, thereby potentially reducing the need for excess electric thruster capacity and potentially simplifying testing required to ensure adequate thruster capability.

Figure 1:
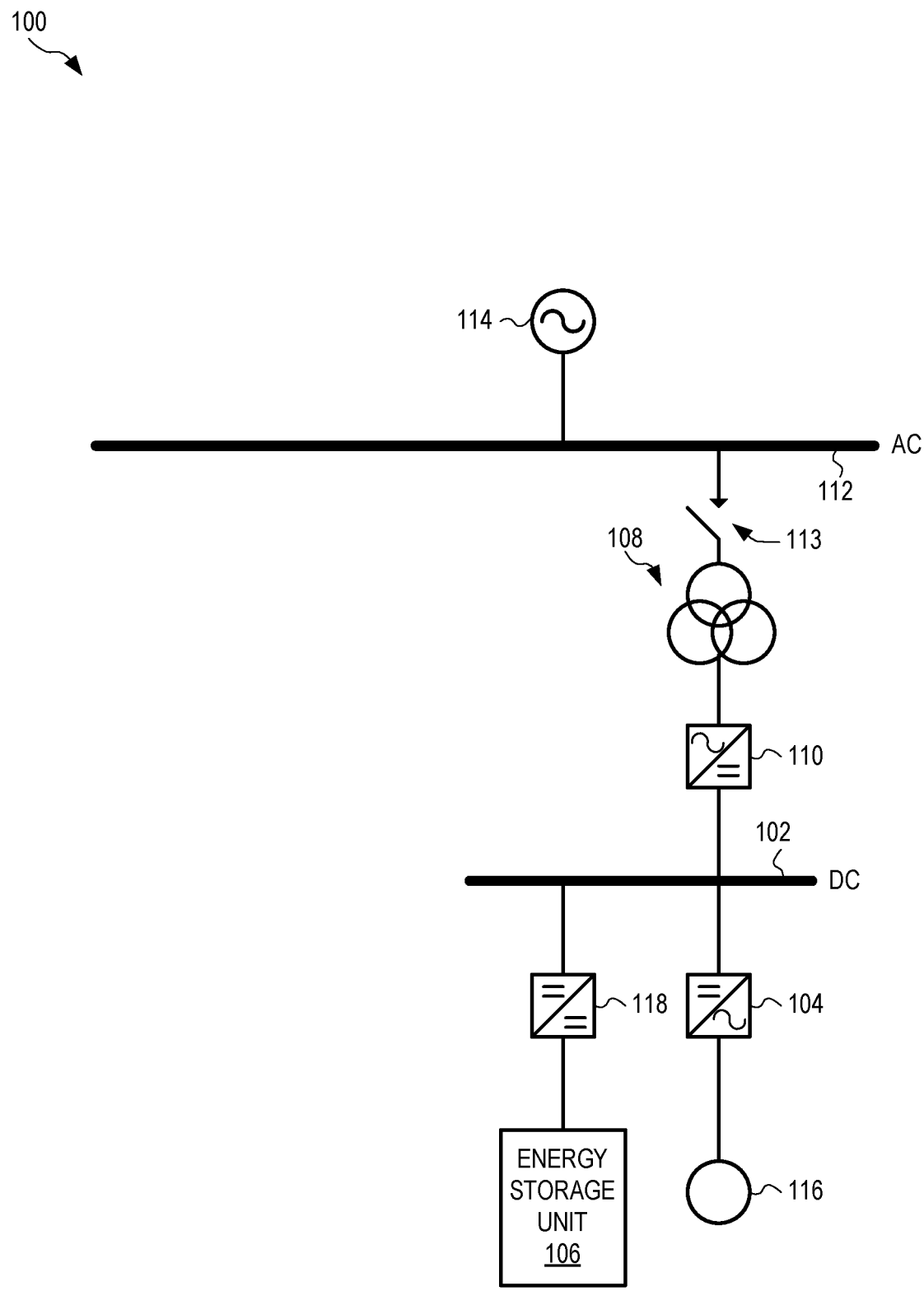
FIG. 1 illustrates a thruster electric power system, according to an embodiment.

FIG. 1 illustrates a thruster electric power system 100 which is one embodiment of the new thruster electric power systems developed by Applicant. Thruster electric power system 100 is included, for example, on a mobile offshore drilling unit. Thruster electric power system 100 includes a thruster DC electric power bus 102, a thruster DC-to-AC converter 104, one or more energy storage units 106, a first transformer 108, and an AC-to-DC converter 110. First transformer 108 is electrically coupled to a first AC electric power bus 112, and AC-to-DC converter 110 is electrically coupled between first transformer 108 and thruster DC electric power bus 102. In some embodiments, first AC electric power bus 112 is at least partially powered from one or more combustion generators 114 electrically coupled to first AC electric bus 112. One or more loads (not shown), in addition to loads powered from thruster DC electric power bus 102, may be powered from first AC electric power bus 112. First AC electric power bus 112 is not necessarily part of thruster electric power system 100.

In some embodiments, thruster electric power system 100 includes one or more circuit breakers and/or disconnect switches to isolate some or all of thruster electric power system 100. For example, in particular embodiments, first transformer 108 is electrically coupled to first AC electric power bus 112 via a circuit breaker 113.

Thruster DC-to-AC converter 104 is configured to electrically couple a respective electric thruster 116 to thruster DC electric power bus 102. In some embodiments, thruster DC-to-AC converter 104 is a variable frequency drive (VFD) capable of generating an AC voltage at a variable frequency for powering electric thruster 116. In some embodiments, AC-to-DC converter 110 and thruster DC-to-AC converter 104 are part of a common power converter. Electric thruster 116 is not necessarily part of thruster electric power system 100. Additionally, although electric thruster 116 is symbolically illustrated as a single component, electric thruster 116 may include multiple interconnected components. The one or more energy storage units 106 are electrically coupled to thruster DC electric power bus 102. In some embodiments, energy storage units 106 are electrically coupled to thruster DC electric power bus 102 via one or more power converters, such as a DC-to-DC converter 118. Each energy storage unit 106 includes, for example, (a) one or more of kinetic generators, (b) a battery storage subsystem, and/or (c) a supercapacitor.

In certain embodiments where each energy storage unit 106 includes one or more kinetic generators, the kinetic generators are capable of storing energy in kinetic form. The kinetic generators receive energy for storage from an electric power bus, e.g., thruster DC electric power bus 102, in an acceleration mode, where energy on the electric power bus is provided, for example, by combustion generators 114 and/or by a regenerative braking component of a load. The kinetic generators are additionally capable of efficiently delivering energy stored therein back to the electric power bus, e.g., thruster DC electric power bus 102, in a generator mode. Importantly, the kinetic generators have a large energy storage capacity and are capable of quickly responding to a change in load. The kinetic generators are also capable of storing and delivering energy at a high rate. In particular embodiments, each kinetic generator (a) is capable of responding to a change in load within ten milliseconds, or within one millisecond in some embodiments, (b) has an energy storage capacity of at least 100 kilowatt hours (kWh), and (c) has a maximum peak power output of at least one megawatt (MW). Additionally, in some embodiments, all kinetic generator instances collectively have an energy storage capacity of at least one megawatt hour (MWh) and are capable of providing an output power of at least 1 MW for five or more minutes. Furthermore, in certain embodiments, the kinetic generators collectively have a maximum power output that is at least as great as that of any one combustion generator 114 instance, such as 4-10 MW.

In some embodiments, the kinetic generators are capable of performing peak shaving and, for example, remove voltage drops caused by increases in power demand at a time scale of about a millisecond or a fraction of a millisecond. For comparison, the response time of a combustion generator is on the order of seconds or more, and the response time of a battery is on the order of about 100 milliseconds or more. Supercapacitors are capable of responding with a time scale of the order of milliseconds. However, the energy capacity of a conventional supercapacitor, or even a conventional supercapacitor array, is orders of magnitude lower than the energy capacity of certain embodiments of the kinetic generators.

In some embodiments, each kinetic generator includes a rotor, a shaft, and a generator module. The rotor is mechanically coupled to the shaft inside a sealed vacuum enclosure, and the rotor and shaft are configured to rotate about an axis to either store energy or to deliver energy. In particular embodiments, each kinetic generator has horizontal extent of less than 2 meters, such as 1.5 meters to promote small system size.

Referring again to FIG. 1, in some embodiments, energy storage units 106 are disposed away from combustion generators 114, such as in a common compartment with thruster DC-to-AC converter 104, such that energy storage units 106 are unlikely to be damaged by a fire or flood in a genset room housing combustion generators 114. Furthermore, in particular embodiments, constituent components of thruster electric power system 100 are housed in a common enclosure, sometimes referred to a thruster enclosure, such that a single point failure, such as a fire in the common enclosure, disables only a single thruster. In some embodiments, the constituent components housed in the common enclosure include, but not are limited to, thruster DC electric power bus 102, thruster DC-to-AC converter 104, energy storage units 106, first transformer 108, AC-to-DC converter 110, and an associated switchboard including, for example, controls for thruster electric power system 100. In certain embodiments, the common enclosure does not contain a combustion generator.

During normal operation of thruster electric power system 100, first AC electric power bus 112 powers thruster DC electric power bus 102, and thruster DC electric power bus 102 powers electric thruster 116. Energy storage units 106 are also charged from thruster DC electric power bus 102, as needed, during normal operation. For example, in embodiments where energy storage units 106 are embodied by one or more kinetic generators, the kinetic generator(s) operates in acceleration mode to store energy, as required during normal operation. Thus, first AC electric power bus 112 indirectly powers electric thruster 116 during normal operation, and first AC electric power bus 112 indirectly charges energy storage units 106 during normal operation. In response to a power failure, e.g., where combination generators 114 are unable to provide electric power to electric thruster 116, such as due to flooding of a genset room housing combustion generator 114, failure of first transformer 108, and/or failure of AC-to-DC converter 110, energy storage units 106 power thruster DC electric power bus 102. For example, in embodiments where energy storage units 106 are embodied by one or more kinetic generators, the kinetic generator operates in generator mode to power thruster DC electric power bus 102. Thus, electric thruster 116 is powered from energy storage units 106 via thruster DC electric power bus 102 during a power failure. In some embodiments, energy storage units 106 have sufficient energy storage capacity to power electric thruster 116 for at least one minute, and preferably for at least five or ten minutes, at full or reduced capacity (e.g., 30% or 40% of a maximum power rating of electric thruster 1516), for example to enable an emergency shutdown (ESD) to be achieved.

Thruster electric power system 100 may achieve significant advantages compared to conventional systems. For example, failure of a single component, such as AC-to-DC converter 110, results in only a single electric thruster 116 being disabled. In many conventional systems, in contrast, failure of a single component results in two electric thrusters being disabled, as discussed above. Additionally, inclusion of one or more energy storage units 106 in thruster electric power system 100 enables electric thruster 116 to operate for a limited time after a power failure. Consequently, use of thruster electric power system 100 in a mobile offshore drilling unit may advantageously reduce required excess electric thruster capacity compared to conventional systems. Additionally, adequate station keeping during a failure may be ensured by less-complex testing than that required in conventional systems. Furthermore, in certain embodiments, thruster power system 100 is capable of operating independently of first AC electric power bus 112 by opening circuit breaker 113. Consequently energy storage units 106 are capable of powering electric thruster 116 independently of first AC electric power bus 112 and combustion generators 114, as well as independently of a power management system associated with first AC electric power bus 112 and combustion generators 114, thereby further promoting reliability.

Moreover, certain embodiments of thruster electric power system 100 are capable of pre-magnetizing first transformer 108 before the transformer is electrically coupled to first AC electric power bus 112, thereby helping reduce, or even essentially eliminate, inrush current into the transformer. In particular, in these embodiments, one or more windings of first transformer 108 are energized from energy storage units 106 before first transformer 108 is electrically coupled to first AC electric power bus 112, such as before circuit breaker 113 is closed. Such pre-magnetizing of first transformer 108 magnetizes first transformer 108's magnetic core before first transformer 108 is electrically coupled to first AC electric power bus 112, thereby helping reduce magnitude of inrush current into first transformer 108 when the transformer is electrically coupled to first AC electric power bus 112. Furthermore, certain embodiments of thruster electric power system 100 are capable of pre-charging thruster DC-to-AC converter 104 from energy storage units 106 before circuit breaker 113 is closed, to prevent possible damage to DC-to-AC converter 104 from excessive charging current.

Figure 2:
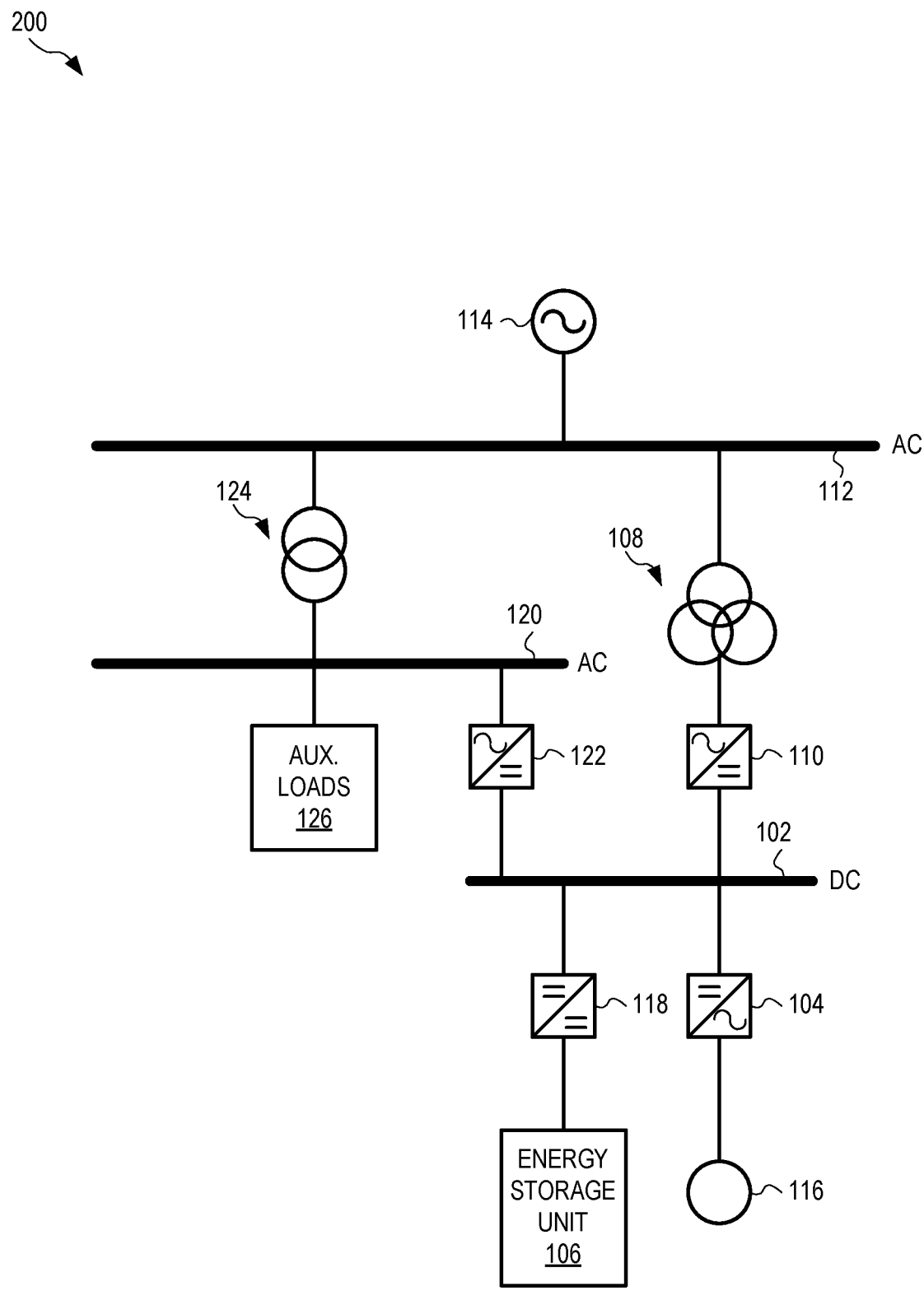
FIG. 2 illustrates another thruster electric power system, according to an embodiment.

Thruster electric power system 100 could be modified to include one or more additional electric power buses without departing from the scope hereof. For example, FIG. 2 illustrates a thruster electric power system 200 which is like thruster electric power system 100 of FIG. 1, but further including an auxiliary AC electric power bus 120, an auxiliary DC-to-AC converter 122, and a second transformer 124. Auxiliary DC-to-AC converter 122 electrically couples thruster DC electric power bus 102 to auxiliary AC electric power bus 120, and second transformer 124 electrically couples first AC electric power bus 112 to auxiliary AC electric power bus 120. Auxiliary AC electric power bus 120 powers, for example, one or more auxiliary electric loads 126 associated with electric thruster 116, such as one or more of an oil pump, a cooling pump, and a HPU. Auxiliary electric loads 126 are not necessarily part of thruster electric power system 200.

During normal operation, first AC electric power bus 112 powers auxiliary electric power bus 120, such that auxiliary loads 126 are powered from first AC electric power bus 112 via auxiliary electric power bus 120. In response to a power failure causing combination generators 114 to be unable to provide electric power to electric thruster 116 and auxiliary electric power bus 120, thruster DC electric power bus 102 powers auxiliary AC electric power bus 120 via auxiliary DC-to-AC converter 122, such that auxiliary loads 126 are powered from energy storage units 106 via auxiliary AC electric power bus 120. Thus, thruster electric power system 200 advantageously enables auxiliary loads 126 to remain powered for a limited time after a power failure.

Figure 3:
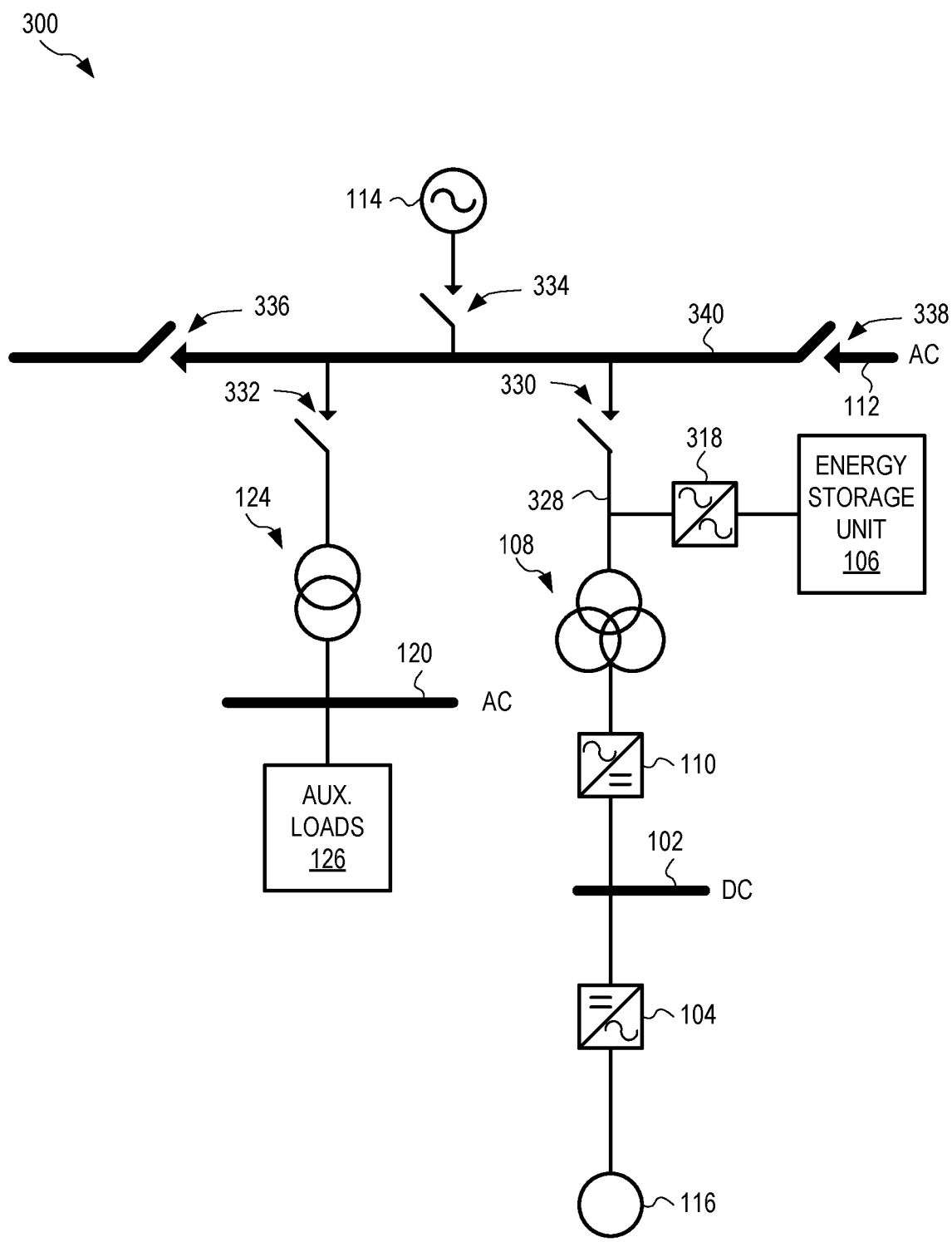
FIG. 3 illustrates a thruster electric power system which is similar to the FIG. 2 thruster electric power system but with energy storage units electrically coupled to a thruster AC electric power bus, according to an embodiment.

The location of energy storage units 106 within the topologies of thruster electric power systems 100 and 200 could be varied without departing from the scope hereof. For example, FIG. 3 illustrates a thruster electric power system 300 which is similar to thruster electric power system 200 of FIG. 2 but with energy storage units 106 electrically coupled to a first thruster AC electric power bus 328 instead of to thruster DC electric power bus 102. Auxiliary DC-to-AC converter 122 is also optionally omitted in thruster electric power system 300, as illustrated. In some embodiments, energy storage units 106 are electrically coupled to first thruster AC electric power bus 328 via one or more power converters, such as an AC-to-AC converter 318. First thruster AC electric power bus 328 electrically couples first transformer 108 to first AC electric power bus 112 via a circuit breaker 330. Energy storage units 106 power electric thruster 116 via thruster DC electric power bus 102 in response to a power failure, such as from combustion generators 114 being unable to provide electric power to electric thruster 116. Thus, energy storage units 106 are configured to power electric thruster 116 independently of first AC electric power bus 112. Additionally, in certain embodiments, energy storage units 106 are configured to power electric thruster 116 independently of a power management system configured to control first AC electric power bus 112 and combustion generators 114. Circuit breaker 330 is configured to isolate first thruster AC electric power bus 328 from first AC electric power bus 112, for example, in event of a fault on first AC electric power bus 112. Optional circuit breaker 332 electrically couples second transformer 124 to first AC electric power bus 112.

In some embodiments, a circuit breaker 334 electrically couples combustion generators 114 to first AC electric power bus 112, and circuit breakers 336 and 338 enable a segment 340 of first AC electric power bus 112 to be isolated from the remainder of first AC electric power bus 112. First transformer 108, second transformer 124, and combustion generators 114 are electrically coupled to segment 340 via respective circuit breakers 330, 332, and 334 in these embodiments. Circuit breakers 334, 336, and 338 enable energy storage units 106 to power auxiliary electric loads 126 if combustion generators 114 fail. In particular, in response to failure of one or more of combustion generators 114, circuit breakers 334, 336, and 338 open to isolate segment 340 from combustion generators 114 and the remainder of first AC electric power bus 112. Circuit breaker 330 remains closed in such case, however, such that energy storage units 106 power auxiliary electric loads 126 via segment 340 and auxiliary AC electric power bus 120. In certain embodiments, energy storage units 106 are configured to power auxiliary electric loads 126 independently of a power management system configured to control first AC electric power bus 112 and combustion generators 1514.

Figure 4:
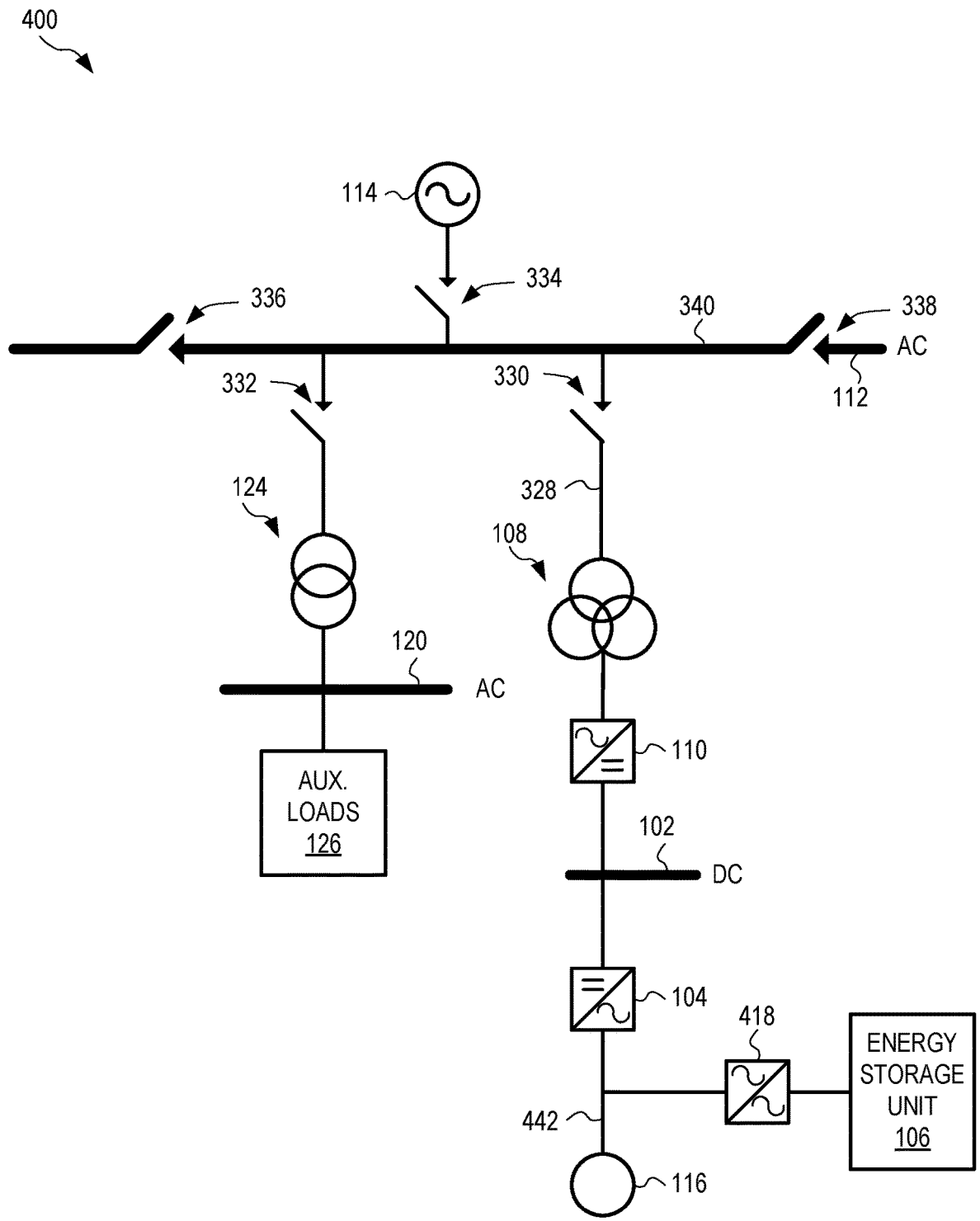
FIG. 4 illustrates another thruster electric power system which is similar to the FIG. 3 thruster electric power system but with energy storage units electrically coupled to a second thruster AC electric power bus, according to an embodiment.

FIG. 4 illustrates a thruster electric power system 400 which is similar to thruster electric power system 300 of FIG. 3, but with energy storage units 106 electrically coupled to a second thruster AC electric power bus 442 instead of to first thruster AC electric power bus 328, such that energy storage units 106 are electrically coupled to electric thruster 116. In some embodiments, energy storage units 106 are electrically coupled to second thruster AC electric power bus 442 via one or more power converters, such as an AC-to-AC converter 418. Second thruster AC electric power bus 442 electrically couples thruster DC-to-AC converter 104 to electric thruster 116. Energy storage units 106 power electric thruster 116 in response to a power failure, and in some embodiments energy storage units 106 further power auxiliary electric loads 126 in the event of combustion generators 114 being unable to provide electric power to electric thruster 116, in a manner similar to that discussed above with respect to FIG. 3.

Figure 5:
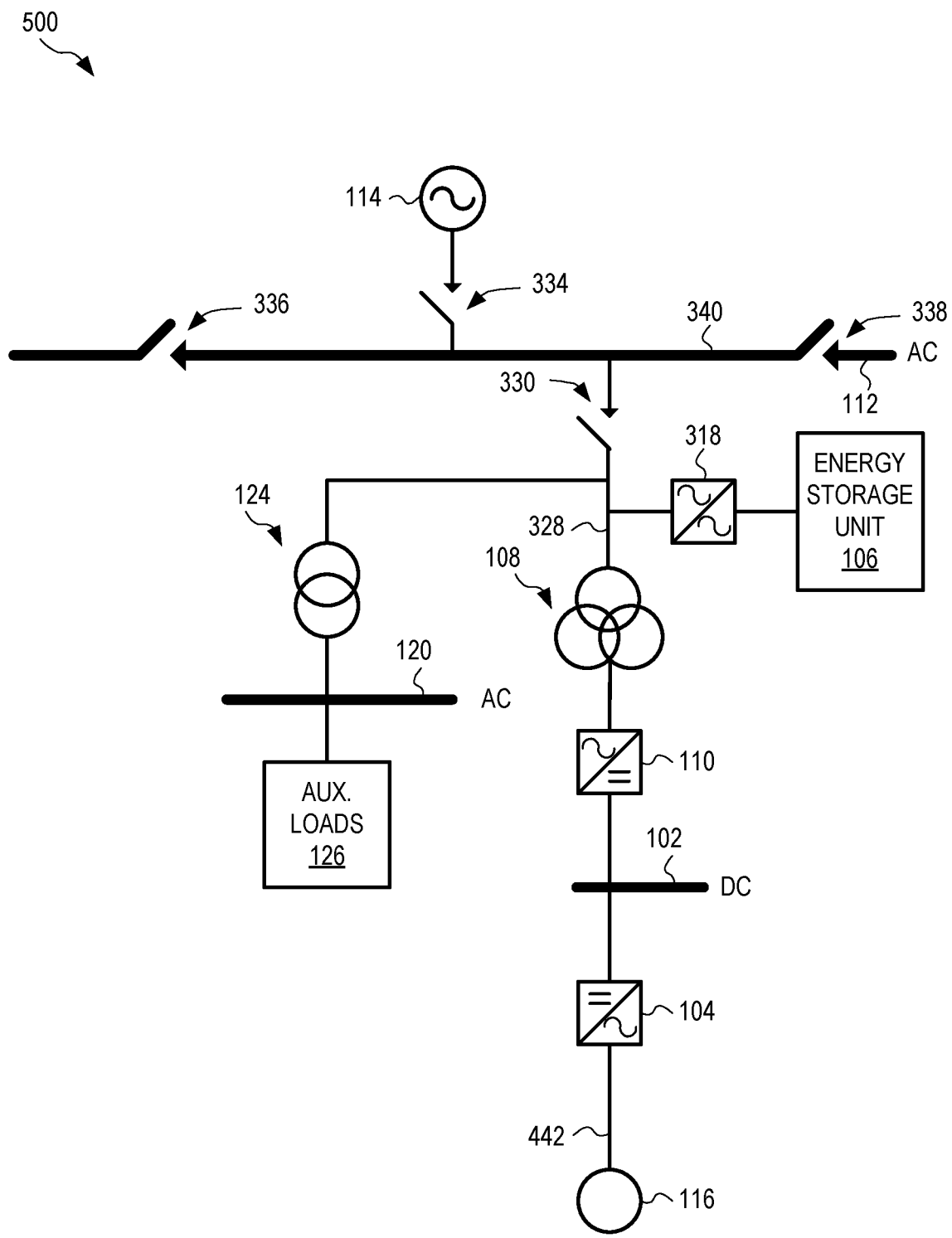
FIG. 5 illustrates a thruster electric power system which is similar to the FIG. 3 thruster electric power system but with first and second transformers electrically coupled to a common AC electric power bus, according to an embodiment.

FIG. 5 illustrates a thruster electric power system 500 which is similar to thruster electric power system 300 of FIG. 3, but with second transformer 124 electrically coupled to first thruster AC electric power bus 328, such that second transformer 124 is behind circuit breaker 330 and auxiliary electric power bus 120 receives electric power from first thruster AC electric power bus 328. This configuration enables energy storage units 106 to power auxiliary electric loads 126 without use of segment 340. In certain embodiments, energy storage units 106 are configured to power electric thruster 116 and auxiliary electric loads 126 independently of a power management system configured to control first AC electric power bus 112 and combustion generators 114, as well as independently of first AC electric power bus 112 itself. Consequently, circuit breakers 336 and 338 could be omitted without loss of ability to power auxiliary electric loads 126 from energy storage units 106. Thruster electric power system 500 could be modified so that energy storage energy units 106 are electrically coupled to thruster DC electric power bus 102 or to second thruster AC electric power bus 442, instead of to first thruster AC electric power bus 328, without departing from the scope hereof.

Figure 6:
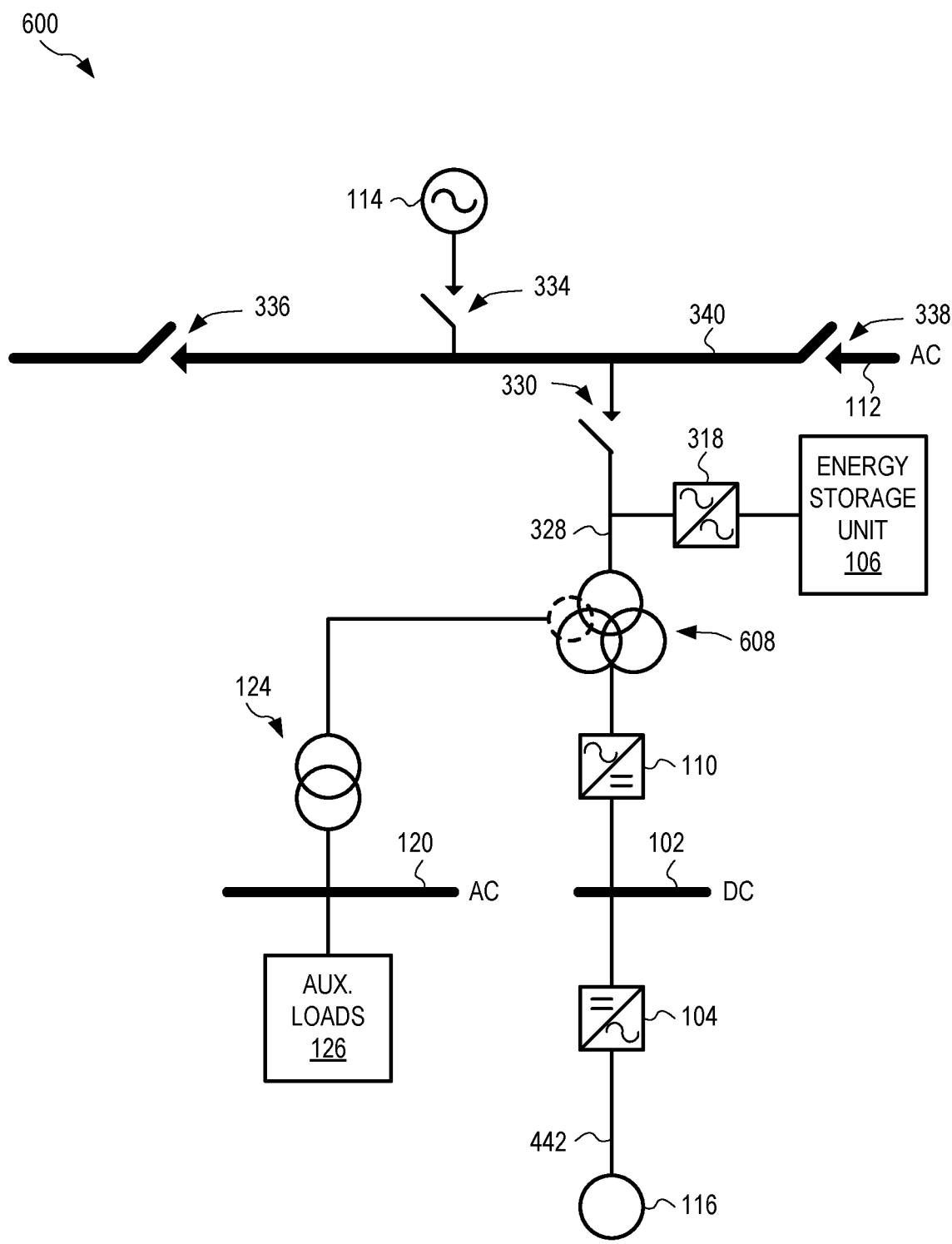
FIG. 6 illustrates a thruster electric power system which is similar to the FIG. 5 thruster electric power system but including a first transformer electrically coupling both an AC-to-DC converter and a second transformer to a first AC electric power bus, according to an embodiment.

FIG. 6 illustrates a thruster electric power system 600 which is similar to thruster electric power system 500 of FIG. 5, but with first transformer 108 replaced with a first transformer 608. First transformer 608 of FIG. 6 is similar to first transformer 108 of FIG. 5, but first transformer 608 of FIG. 6 includes one or more additional secondary windings electrically coupled to second transformer 124, such that first transformer 608 electrically couples both AC-to-DC converter 110 and second transformer 124 to first AC electric power bus 112 via first thruster AC electric power bus 328. Thus, auxiliary AC electric power bus 120 is electrically coupled to first thruster AC electric power bus 328 via first transformer 608, and auxiliary AC electric power bus 120 receives electric power from first thruster AC electric power bus 328 via first transformer 608. During normal operation of thruster electric power system 600, first AC electric power bus 112 powers both electric thruster 116 and auxiliary electric loads 126 via first transformer 608, and energy storage units 106 power both electric thruster 116 and auxiliary electric loads 126 via first transformer 608 during a power failure. In certain embodiments, energy storage units 106 are configured to power electric thruster 116 and auxiliary electric loads 126 independently of a power management system configured to control first AC electric power bus 112 and combustion generators 114, as well as independently of first AC electric power bus 112 itself. Thruster electric power system 600 could be modified so that energy storage energy units 106 are electrically coupled to thruster DC electric power bus 102 or to second thruster AC electric power bus 442, instead of to first thruster AC electric power bus 328, without departing from the scope hereof.

Figure 7:
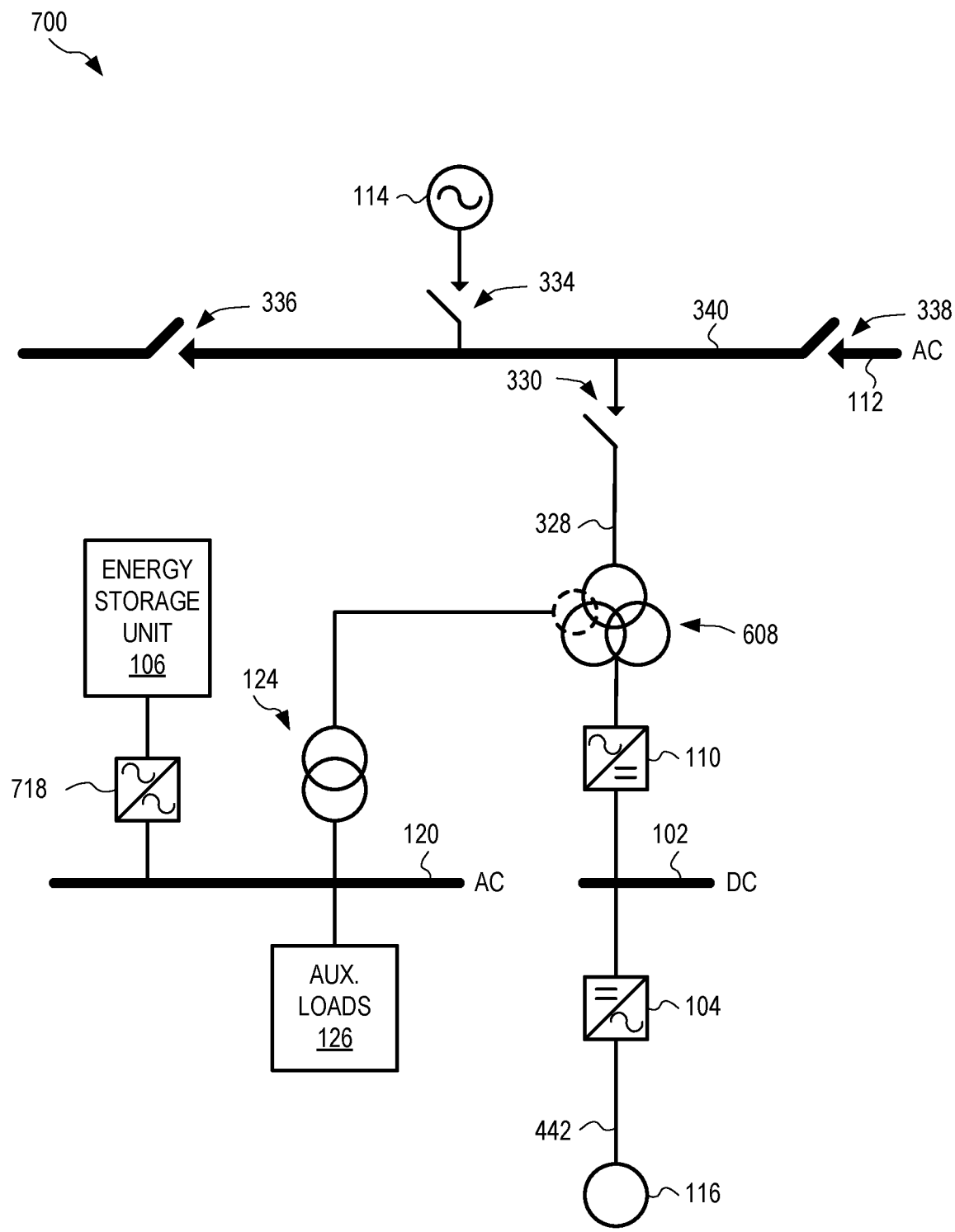
FIG. 7 illustrates a thruster electric power system which is similar to the FIG. 6 thruster electric power system but with energy storage energy units electrically coupled to an auxiliary AC electric power bus, according to an embodiment.
Figure 8:
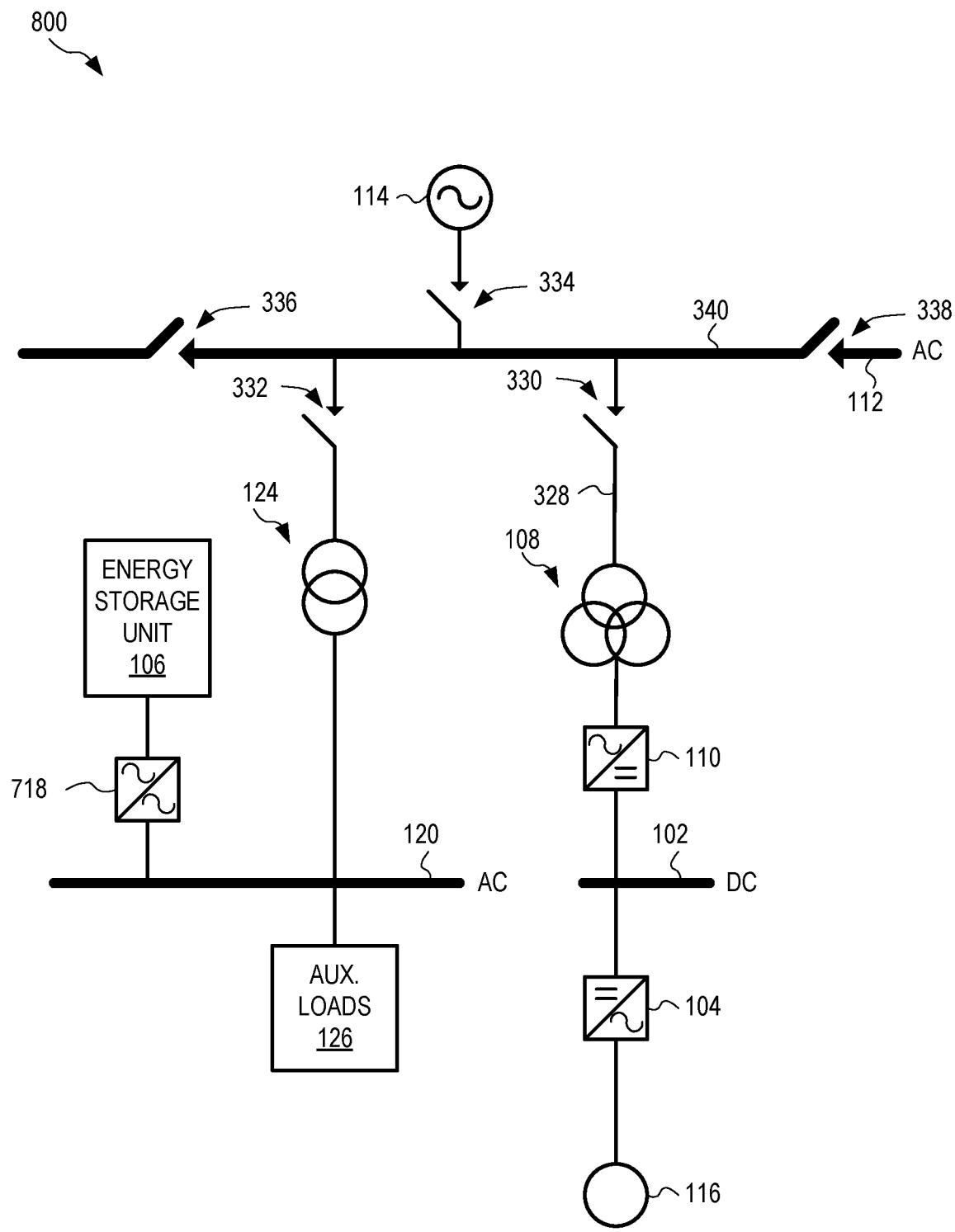
FIG. 8 illustrates a thruster electric power system which is similar to the FIG. 3 thruster electric power system, but with energy storage energy units electrically coupled to an auxiliary AC electric power bus, according to an embodiment.

FIG. 7 illustrates a thruster electric power system 700 which is similar to thruster electric power system 600 of FIG. 6, but with energy storage energy units 106 electrically coupled to auxiliary AC electric power bus 120 instead of to first thruster AC electric power bus 328. In some embodiments, energy storage units 106 are electrically coupled to auxiliary AC electric power bus 120 via one or more power converters, such as an AC-to-AC converter 718. Accordingly, energy storage energy units 106 power both thruster 116 and auxiliary electric loads 126 during a power failure. In certain embodiments, energy storage units 106 are configured to power electric thruster 116 and auxiliary electric loads 126 independently of a power management system configured to control first AC electric power bus 112 and combustion generators 114, as well as independently of first AC electric power bus 112 itself FIG. 8 illustrates another thruster electric power system with energy storage energy units 106 electrically coupled to auxiliary AC electric power bus 120. In particular, FIG. 8 illustrates a thruster electric power system 800 which is similar to thruster electric power system 300 of FIG. 3, but with energy storage energy units 106 electrically coupled to auxiliary AC electric power bus 120 instead of to first thruster AC electric power bus 328. In some embodiments, energy storage units 106 are electrically coupled to auxiliary AC electric power bus 120 via one or more power converters, such as an AC-to-AC converter 818.

In the event of a power failure, energy storage units 106 power auxiliary electric loads 126 via auxiliary AC electric power bus 120, and energy storage units 106 also power electric thruster 116 if segment 340 of first AC electric power bus 112 is operational, such that electric power flows from energy storage units 106 to electric thruster 116 via auxiliary AC electric power bus 120 and segment 340. Thus, energy storage units 106 are configured to power auxiliary electric loads 126 independently of first AC electric power bus 112. Additionally, in certain embodiments, energy storage units 106 are configured to power electric thruster 116 and auxiliary electric loads 126 independently of a power management system configured to control first AC electric power bus 112 and combustion generators 114.

Figure 16:
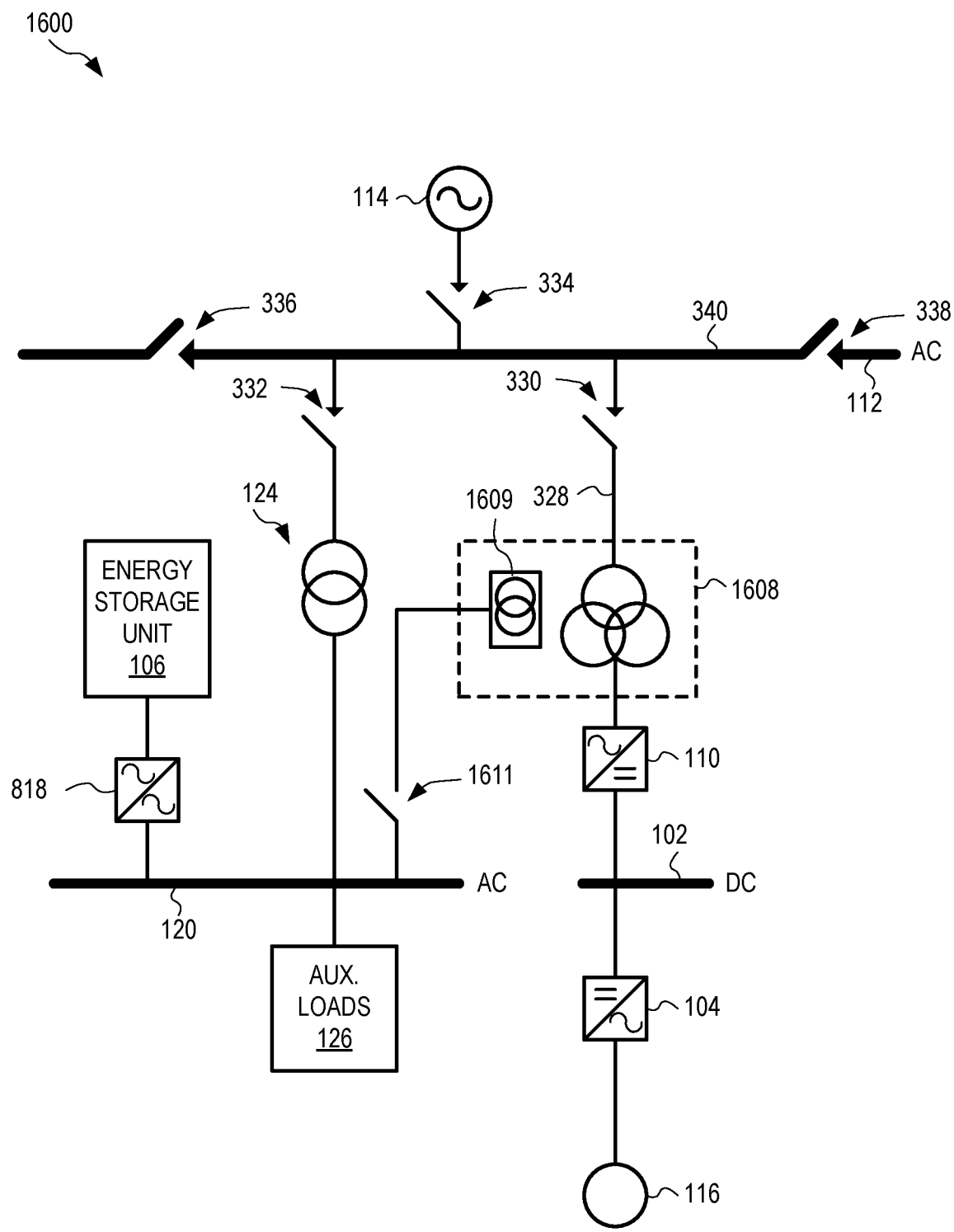
FIG. 16 illustrates a thruster electric power system which is similar to the FIG. 7 thruster electric power system but further capable of pre-magnetizing a transformer, according to an embodiment.

Thruster electric power system 800 could be modified to be capable of pre-magnetizing the first transformer before the first transformer is electrically coupled to first AC electric power bus 112, thereby helping reduce, or even essentially eliminate, inrush current into the transformer. For example, FIG. 16 illustrates a thruster electric power system 1600 which is similar to thruster electric power system 700 of FIG. 7 but with first transformer 108 replaced with a first transformer 1608 including a forth winding 1609 electrically coupled to auxiliary AC electric power bus 120 via a switch 1611. Switch 1611 is closed to pre-magnetize first transformer 1608 from energy storage energy units 106 before circuit breaker 330 is closed. Additionally, in certain embodiments, thruster electric power system 1600 is further configured to pre-charge thruster DC-to-AC converter 104 from energy storage units 106 before circuit breaker 330 is closed.

Figure 9:
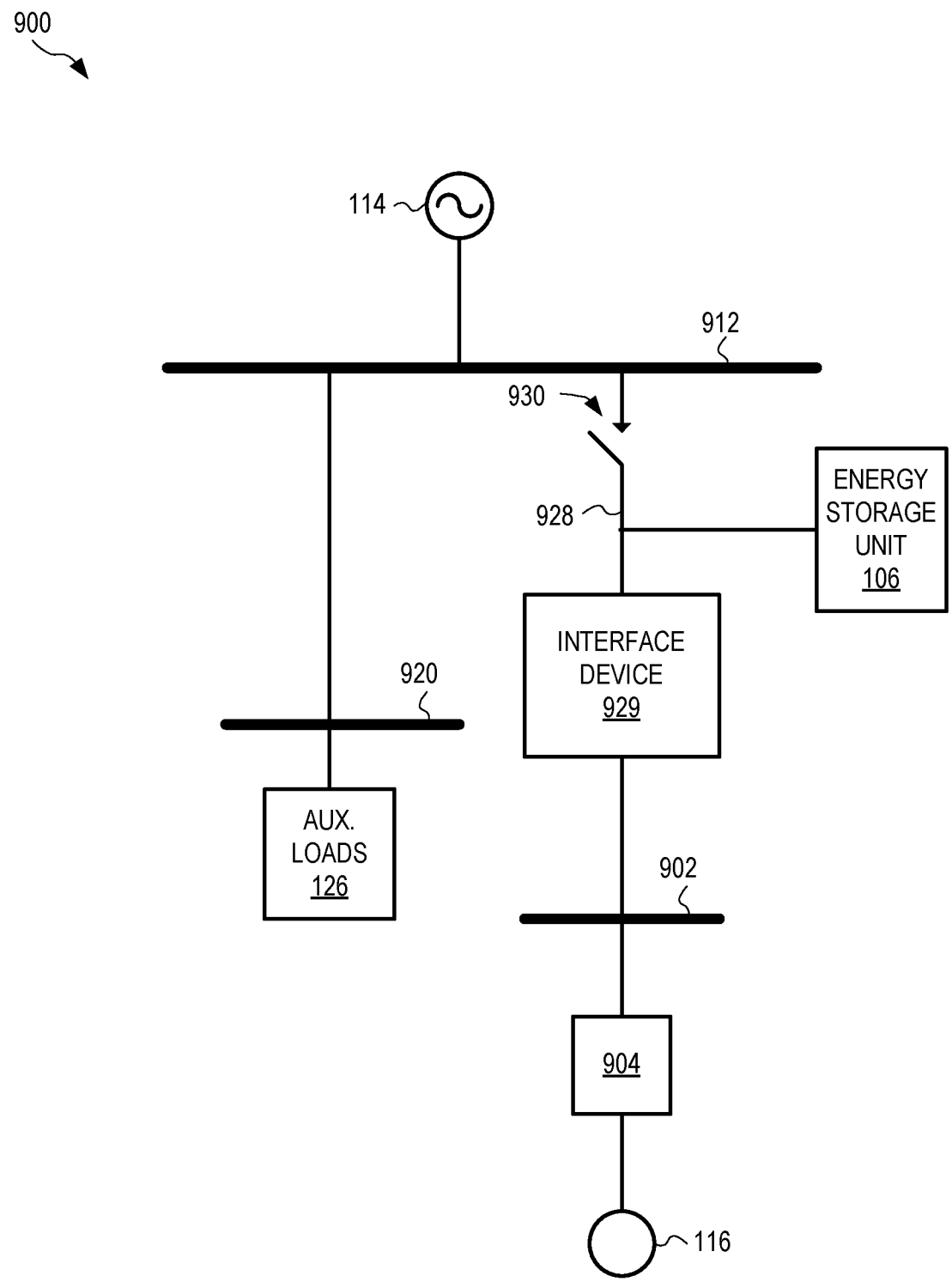
FIG. 9 illustrates another thruster electric power system, according to an embodiment.

The types of electric buses within the thruster electric power systems discussed above could be varied without departing from the scope hereof. For example, an AC bus could be replaced with a DC bus, or vice versa, with appropriate changes to interface devices, such as transformers and converters. FIG. 9 illustrates a thruster electric power system 900 which is similar to thruster electric power system 300 but with electric power buses more generally described to illustrate several possible electric power bus configurations. Thruster electric power system 900 includes a thruster electric power bus 902, a thruster converter 904, an additional electric power bus 928, an interface device 929, an auxiliary electric power bus 920, and one or more energy storage units 106. Interface device 929, which includes, for example, a transformer and/or a converter, electrically couples thruster electric power bus 902 to additional electric power bus 928. Thruster converter 904 electrically couples electric thruster 116 to thruster electric power bus 902. An optional circuit breaker 930 electrically couples additional electric power bus 928 to a main electric power bus 912, and one or more combustion generators 114 are electrically coupled to main electric power bus 912. Although energy storage units 106 are shown as being electrically coupled to additional electric power bus 928, energy storage units 106 could alternately be electrically coupled to thruster electric power bus 902 or to electric thruster 116 without departing from the scope hereof. Additionally, thruster electric power system 900 may include additional interface devices without departing from the scope hereof.

Each of thruster electric power bus 902, additional electric power bus 928, and auxiliary electric power bus 920 could be either an AC electric power bus or a DC electric power bus. For example, in one embodiment, thruster electric power bus 902 is a DC electric power bus analogous to thruster DC electric power bus 102, additional electric power bus 928 is an AC electric power bus analogous to first thruster AC electric power bus 328, and auxiliary electric power bus 920 is an AC electric power bus analogous to auxiliary AC electric power bus 120. As another example, in another embodiment, each of thruster electric power bus 902, additional electric power bus 928, and auxiliary electric power bus 920 is a DC electric power bus. As yet another example, in a particular embodiment, additional electric power bus 928 and auxiliary electric power bus 920 are each DC electric power buses, and thruster electric power bus 902 is an AC electric power bus.

Figure 10:
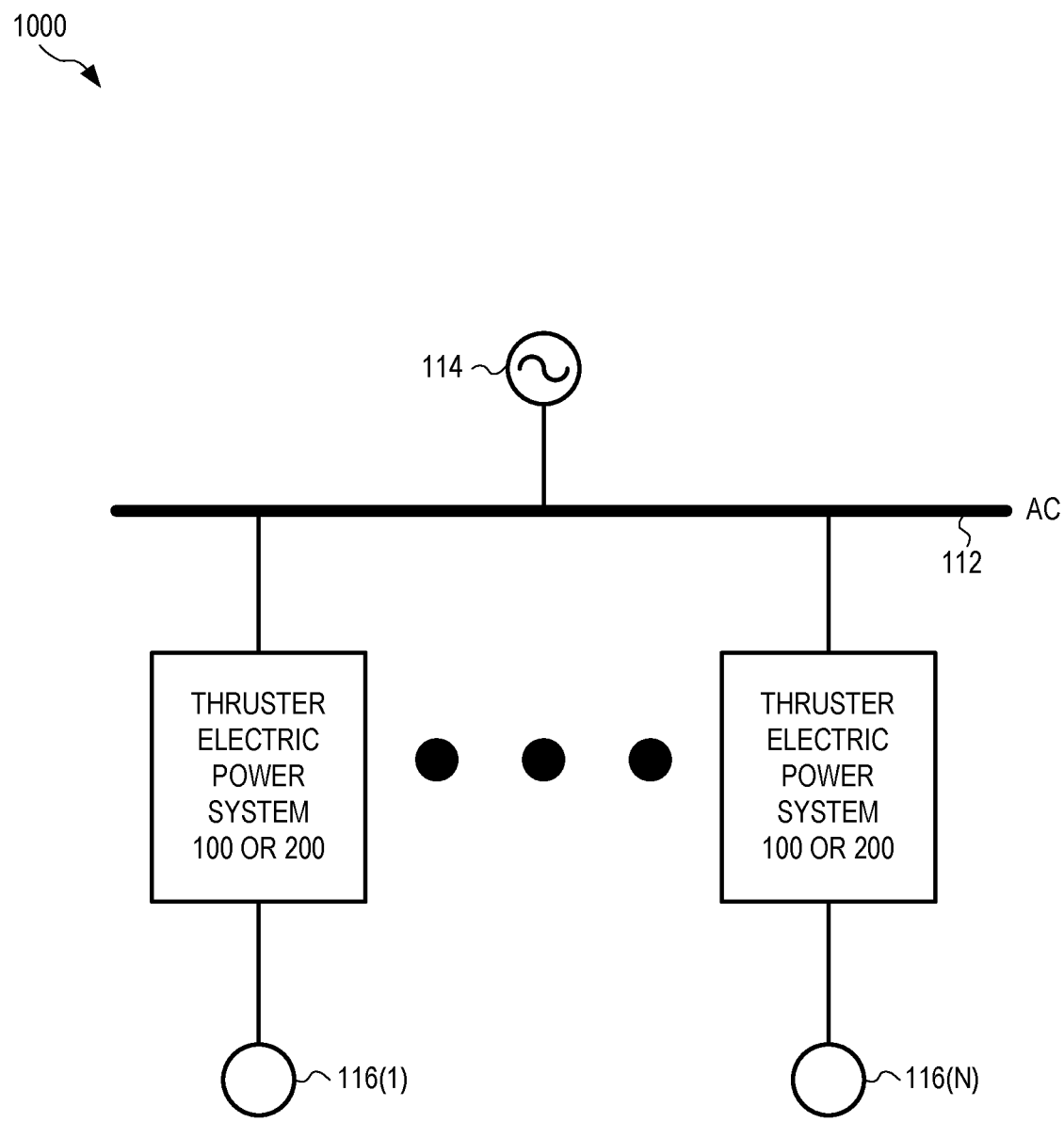
FIG. 10 illustrates a portion of a mobile offshore drilling unit including a plurality of thruster electric power systems, according to an embodiment.

A mobile offshore drilling unit may include a respective thruster electric power system 100, 200, 300, 400, 500, 600, 700, 800, or 900 for each electric thruster 116. For example, FIG. 10 illustrates a portion of a mobile offshore drilling unit 1000 including N electric thrusters 116, where N is an integer greater than one and where each electric thruster 116 is powered by a respective thruster electric power system 100 or 200. Details of thruster electric power systems are not shown in FIG. 10 to promote illustrative clarity. Such powering of each electric thruster 116 by a respective thruster electric power system 100 or 200 advantageously prevents more than one electric thruster 116 from being disabled in response to a single point failure. For instance, in certain embodiments, the constituent components of each thruster electric power system 100 or 200 are housed in a respective enclosure of the thruster electric power system, such that a single point failure, such as flooding of one enclosure, disables only one electric thruster 116 instance.

Figure 11:
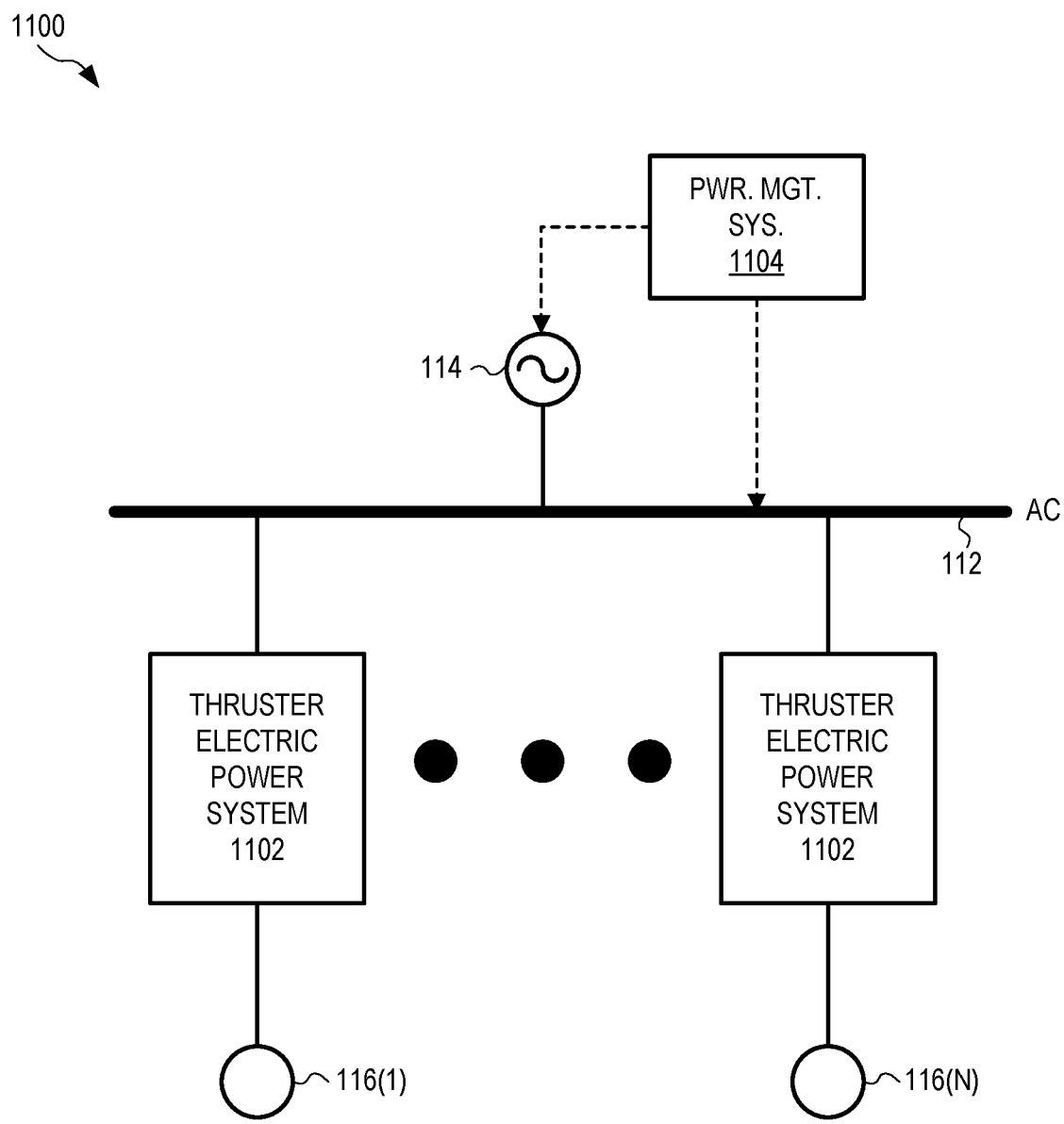
FIG. 11 illustrates a portion of another mobile offshore drilling unit including a plurality of thruster electric power systems, according to an embodiment.

As another example, FIG. 11 illustrates a portion of a mobile offshore drilling unit 1100 including N electric thrusters 116, where N is an integer greater than one and where each electric thruster 116 is powered by a respective thruster electric power system 1102. Each thruster electric power system 1102 is one of thruster electric power system 100, 200, 300, 400, 500, 600, 700, 800, or 900. Details of thruster electric power systems 1102 are not shown in FIG. 11, to promote illustrative clarity. Mobile offshore drilling unit 1100 further includes an instance of first AC electric power bus 112, one or more combustion generators 114 electrically coupled to first AC electric power bus 112, and a power management system 1104 configured to control at least first AC electric power bus 112 and combustion generators 114. Thruster electric power systems 1102 are optionally configured to power their respective electric thrusters 116 independently of operation of power management system 1104. In some embodiments, each thruster electric power system 1102 is disposed in a respective thruster enclosure, and the thruster enclosures are optionally located at a stern end of mobile offshore drilling unit 1100.

Figure 12:
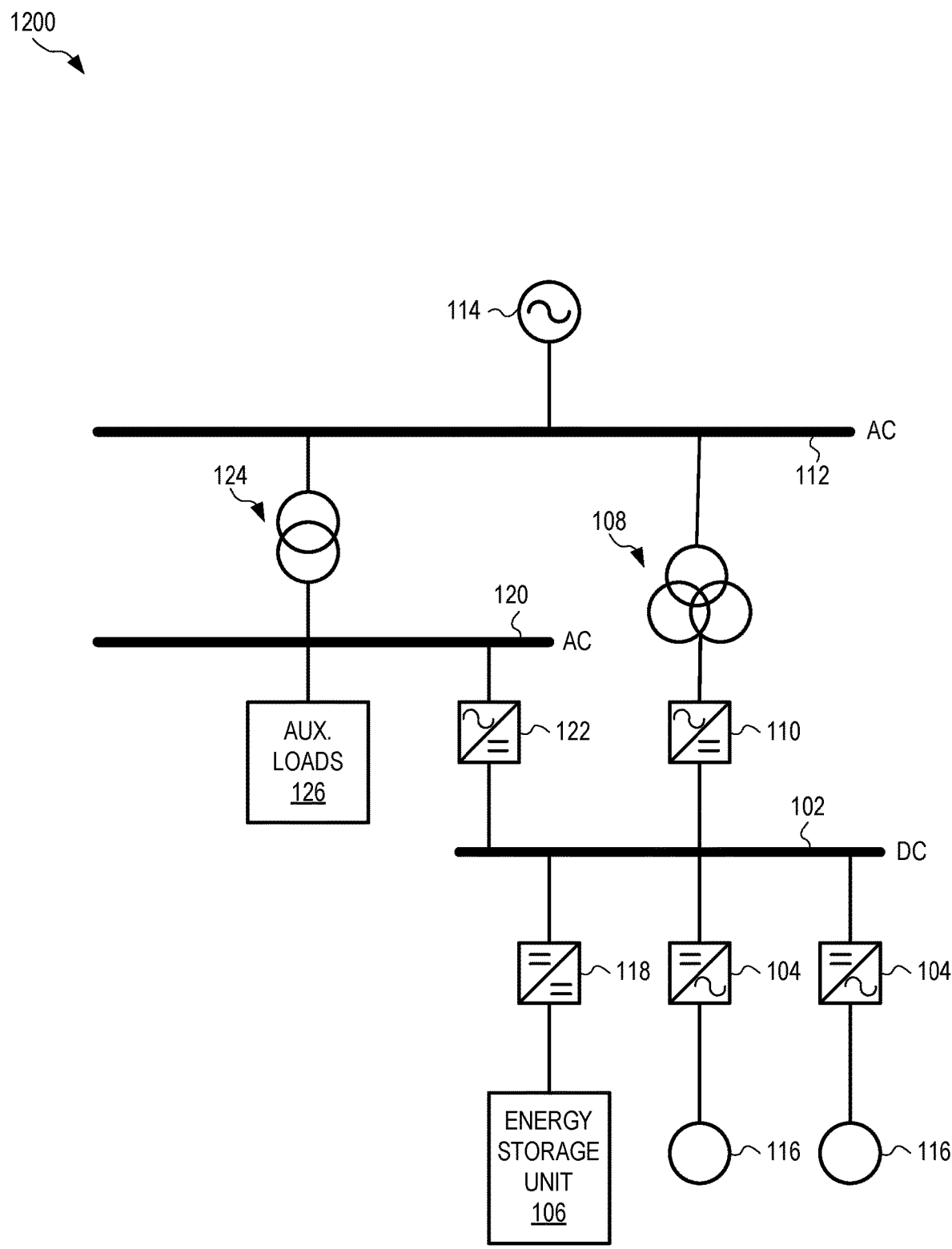
FIG. 12 illustrates a thruster electric power system which is like the FIG. 2 thruster electric power system, but further includes a second thruster DC-to-AC converter, according to an embodiment.

In some applications it may be acceptable for more than one electric thruster to be disabled in response to a single failure. Accordingly, any of the thruster electric power systems disclosed herein could be modified to power two or more additional electric thrusters 116 without departing from the scope hereof. For example, FIG. 12 illustrates a thruster electric power system 1200 which is like thruster electric power system 200 of FIG. 2 but includes a second thruster DC-to-AC converter 104 configured to be electrically coupled to a second electric thruster 116.

Figure 13:
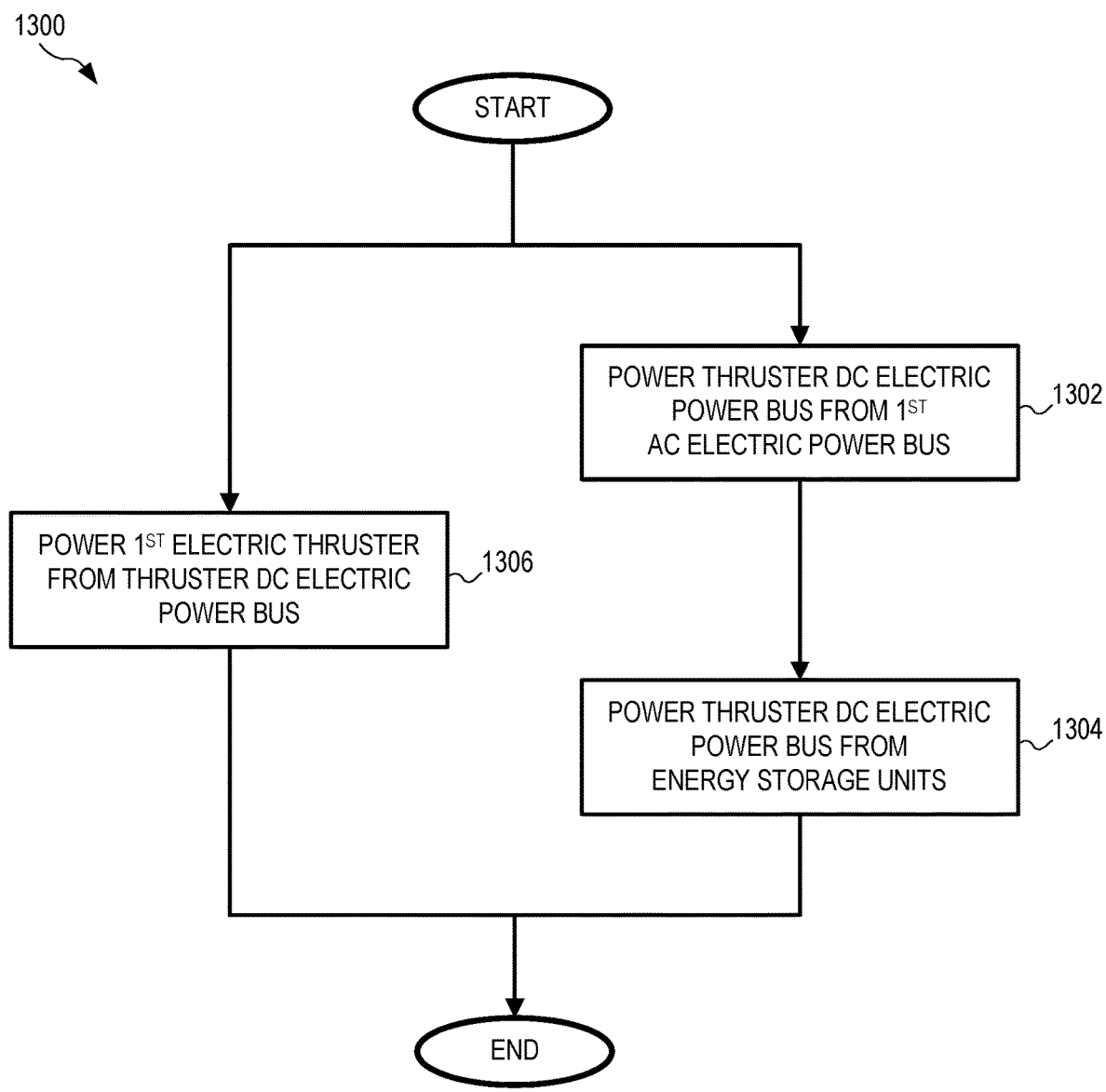
FIG. 13 illustrates a method for powering one or more electric thrusters of a mobile offshore drilling unit, according to an embodiment.

FIG. 13 illustrates a method 1300 for powering one or more electric thrusters of a mobile offshore drilling unit. In step 1302, a thruster DC electric power bus is powered from a first AC electric power bus. In one example of step 1302, thruster DC electric power bus 102 is powered from first AC electric power bus 112 via first transformer 108 and AC-to-DC converter 110. In step 1304, the thruster DC electric power bus is powered from one or more energy storage units electrically coupled to the thruster DC electric power bus, in response to a power failure. In one example of step 1304, thruster DC electric power bus 102 is powered from energy storage units 106 in response to electric power being unavailable from first AC electric power bus 112, such due to a failure of combustion generator 114, failure of first transformer 108, and/or failure of AC-to-DC converter 110. In step 1306, which is performed in parallel with both of steps 1302 and 1304, a first electric thruster is powered from the thruster DC electric power bus. In one example of step 1306, electric thruster 116 is powered from thruster DC electric power bus 102.

Certain embodiments include a respective energy storage unit 106 for each electric thruster 116 which may be particular advantageous as operation of thrusters can be ensured substantially independent of the operability of the remaining power plan. In a power failure situation the energy storage unit(s) 106 is advantageously arranged to allow thruster operation at sufficient power and for a sufficient period of time to allow an emergency procedure to be performed and/or for power to be reinstated. For drilling units such as drillships, semi-submersibles, workover vessels or the like an emergency procedure is typically an EDS. Sufficient power is in most embodiments sufficient power to allow the thruster (typically in conjunction with other thrusters such as two or more thrusters, such as 3 or more thrusters, such as 4 or more thrusters, such as 5 or more thrusters, such as 6 or more thrusters and/or all thrusters or the vessel except 1, such as all except two, such as all except three) to prevent or reduce drift off. In some embodiments such power is 20% or the max capacity of the thruster or more, such as 40% or more, such as 60% or more, such 80% or more, such 100%. In some embodiments such power is 0.5 MW or more, such as 1 MW or more, such as 1.5 MW or more, such as 2 MW or more, such as 2.5 MW or more. In some embodiments, the emergency procedure, such as an EDS, requires such power in 30 seconds or more, such as 60 seconds or more, such as 120 seconds or more. In some embodiment, power recovery will be attempted prior to performing the emergency procedure which in turn may require the timer period where sufficient power is available from the energy storage(s) to be longer such as 180 seconds or more. Consequently, providing a respective energy storage unit 106 for each electric thruster 116, where the storage unit(s) 106 is capable of providing an additional 0.5 MW of operational reserve. The operational reserve is used, for example, for peak shaving. Power output capability of energy storage units 106 could be adjusted according to varying operational reserve requirements. For example, if no operational reserve is required, each energy storage unit 106 could be configured to provide only 2 MW of power for at least 120 seconds. As another example, if additional operational reserve is required, additional energy storage units 106 capable of providing a power output of 2.5 MW for at least 120 seconds could be provided, or maximum power capability of energy storage units 106 could be increased.

Additionally, certain embodiments include a respective energy storage bank for each electric thruster bank, where (a) each energy storage bank includes one or more energy storage units 106 and (b) each electric thruster bank includes one or more electric thrusters 116. In these embodiments, each energy storage bank has sufficient capacity to (a) power electric thrusters 116 of its respective electric thruster bank and (b) provide power that would otherwise be provided by one or more gensets. For example, in one embodiment where each genset has a capacity of 2 MW, each energy storage bank has sufficient capacity to power its respective electric thrusters 116 plus an additional capacity of 2 MW to replace one genset.

It may be necessary to operate drilling equipment in addition to electric thrusters to perform a complete ESD on a mobile offshore drilling unit. Accordingly, some embodiments include (a) one or more energy storage units electrically coupled to an AC and/or DC electric power bus of the system and (b) one or more instances of the thruster electric power systems disclosed herein. Such embodiments are advantageously capable of operating both thrusters and additional drilling equipment for a limited time during a power failure, to help enable complete ESD. The energy storage units electrically coupled to the AC and/or DC electric power buses are, for example, (a) one or more of the kinetic energy subsystems discussed above, (b) one or more battery storage subsystems, and/or (c) one or more supercapacitors.

Figure 14:
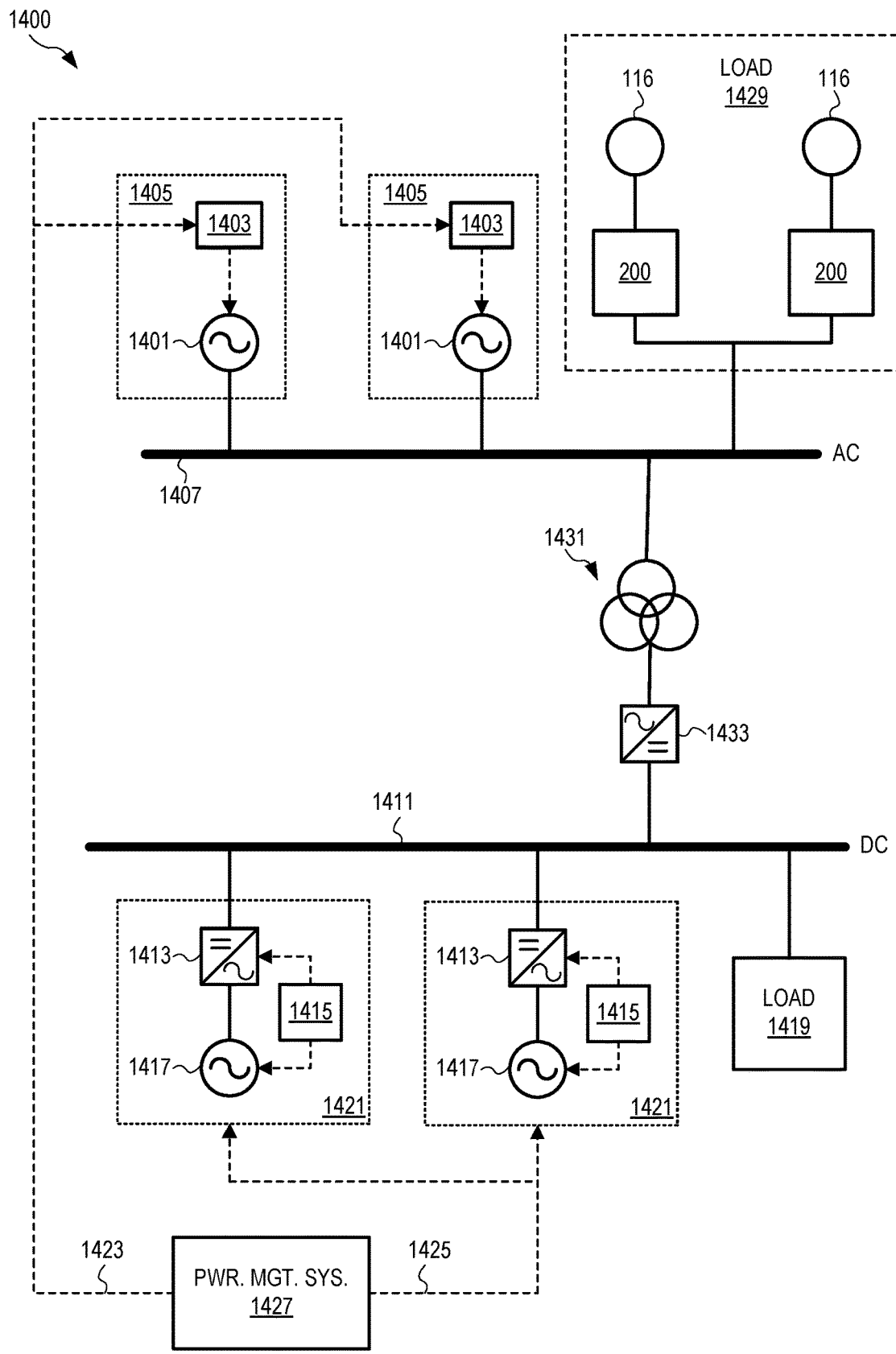
FIG. 14 illustrates a microgrid electric power generation system, according to an embodiment.

For example, FIG. 14 illustrates a microgrid electric power generation system 1400 including an AC electric power bus 1407 electrically coupled to a DC electric power bus 1411 by a three-phase transformer 1431 and an AC-to-DC converter 1433. One or more combustion generators 1401 are electrically coupled to AC electric power bus 1407, and one or more kinetic generators 1417 are electrically coupled to DC electric power bus 1411 via respective DC-to-AC converters 1413. Although not required, it is anticipated that a first load 1429 is powered by the AC electric power bus 1407 and that a second load 1419 is powered by DC electric power bus 1411. While each of first load 1429 and second load 1419 is symbolically shown as a single element in FIG. 14 for illustrative clarity, is anticipated that each of first load 1429 and second load 1419 will typically include an electric load of a number of elements. In certain embodiments, load 1429 includes one or more electric thrusters powered by respective motor drives. Additionally, in some embodiments, load 1419 includes one or more AC electric motors powered by respective motor drives, such as to power one or more of drawworks, winches, HPUs, electric thrusters, mud pumps, top drives, rotary tables, and dynamic braking systems. In certain embodiments, nominal voltage of DC electric power bus 1411 ranges from 720 volts to 1 kilovolt DC, and nominal voltage on AC electric bus 1407 ranges from 6.6 to 11 kilovolts AC. However, nominal magnitude of voltage on AC electric power bus 1407 and nominal magnitude of voltage on DC electric power bus 1411 may vary without departing from scope hereof.

DC-to-AC converters 1413 electrically couple a respective kinetic generator 1417 to a DC electric power bus, instead of to an AC electric power bus. In particular, in acceleration mode of kinetic generators 1417, each second control subsystem 1415 controls the DC-to-AC converter 1413 of its respective kinetic generator 1417 and the motor/generator within the kinetic generator such that energy from DC electric power bus 1411 is stored as kinetic energy in the kinetic generator. In generator mode of kinetic generators 1417, each second control subsystem 1415 controls the DC-to-AC converter 1413 of its respective kinetic generator 1417 and the motor/generator within the kinetic generator such that energy from the kinetic generator is delivered to DC electric power bus 1411. Each second control subsystem 1415 also controls its respective DC-to-AC converter 1413 in generator mode of kinetic generators 1417 such that output voltage of the DC-to-AC converter at DC electric power bus 1411 is within a predetermined voltage range, thereby regulating voltage $V_{bus\_dc}$ on DC electric power bus 1411.

Each kinetic generator 1417, its respective DC-to-AC converter 1413, and its respective second control subsystem 1415 may be collectively referred to as a kinetic energy subsystem 1421. Each kinetic energy subsystem 1421 has a small time constant, i.e., time required for the kinetic energy subsystem 1421 to change its power storage or delivery by 10%. For example, in a particular embodiment, each kinetic energy subsystem 1421 has time constant of 10 milliseconds or less, such that the kinetic energy subsystem 1421 is capable of changing its energy storage or delivery rate by 10% within 10 milliseconds of a change in magnitude of load.

System 1400 could have additional instances of combustion generators 1401 and/or kinetic generators 1417 without departing from the scope hereof. For example, one or more kinetic generators 1417 could be electrically coupled to AC electric power bus 1407 to enable one or more kinetic generators 1417 to support loads 1429 in embodiments where AC-to-DC converter 1433 is incapable of transferring power from DC electric power bus 1411 to AC electric power bus 1407. Furthermore, system 1400 could be modified to include additional AC and/or DC electric power buses without departing from the scope hereof.

In some embodiments of system 1400, AC-to-DC converter 1433 has bidirectional power transfer capability. In these embodiments, system 1400 is optionally configured such that kinetic generators 1417 may be used to power AC electric power bus 1407 in case of failure or shutdown of combustion generators 104 through a "reverse" energy travel path through AC-to-DC converter 1433 and three-phase transformer 1431. In some other embodiments, AC-to-DC converter 1433 is a unidirectional power converter, i.e., it can transfer power solely from AC electric bus 1407 to DC electric bus 1411. In these embodiments, three-phase transformer 1431 optionally has an auxiliary winding, in addition to primary and secondary windings, and system 1400 further includes a DC-to-AC converter (not shown) capable of transferring power from DC electric bus 1411 to AC electric bus 1407 via the DC-to-AC converter and the auxiliary winding.

System 1400 further includes a plurality of instances of thruster electric power system 200 powering respective electric thrusters 116. Details of thruster electric power systems 200 are not shown in FIG. 14 to promote illustrative clarity. The energy storage units of thruster electric power systems 200 are capable of powering their respective electric thrusters 116 during a power failure, and kinetic energy subsystems 1421 are capable of powering additional drilling equipment represented by load 1419 during a power failure, to help achieve complete ESD. One or more of kinetic energy subsystems 1421 in FIG. 14 could be replaced with an alternative energy storage device, e.g., a battery storage subsystem and/or a supercapacitor, while maintaining the ability to achieve complete ESD, albeit without the advantages associated with use of kinetic energy subsystems.

Figure 15:
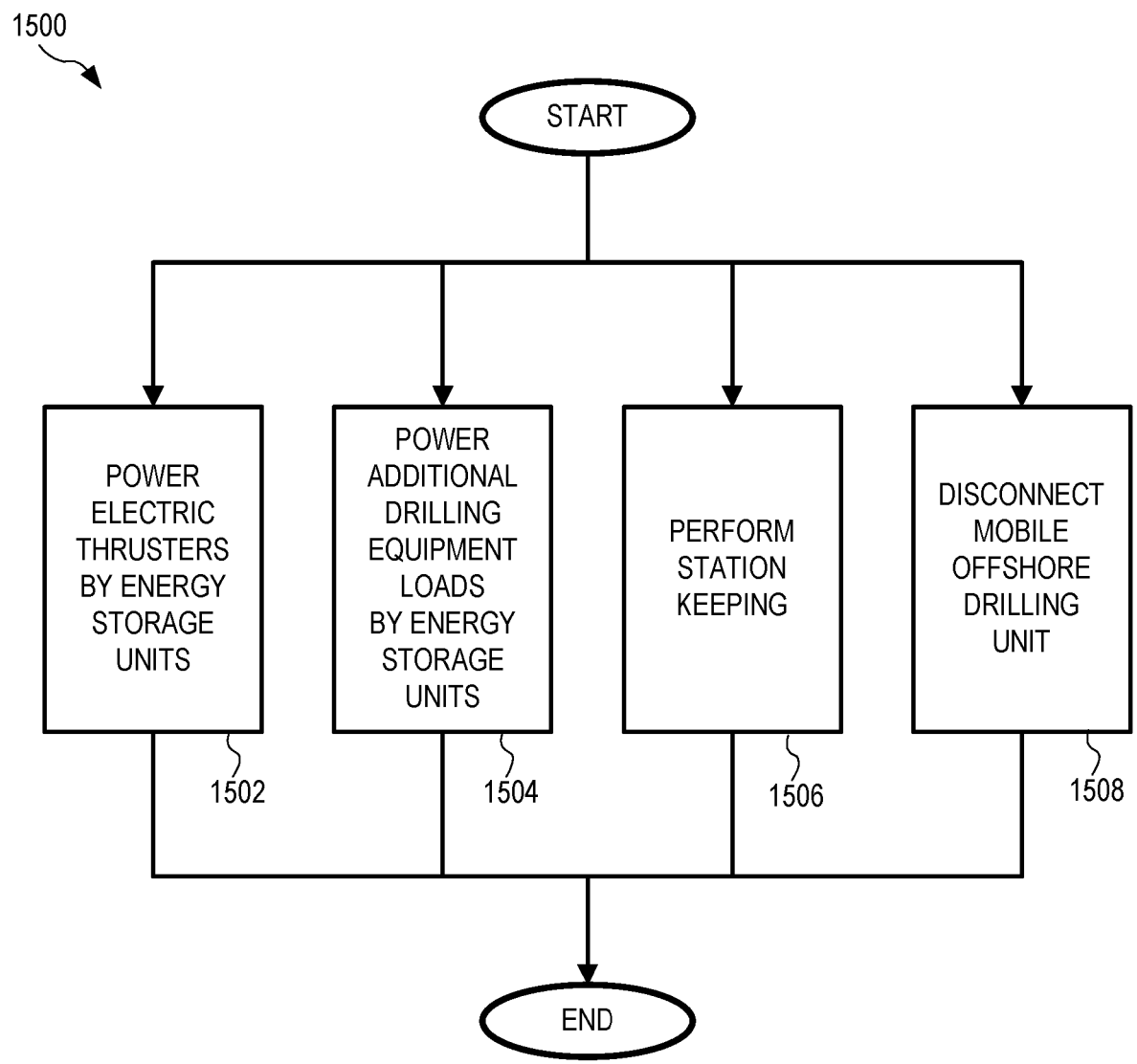
FIG. 15 illustrates a method for operating a mobile offshore drilling unit in case of an emergency, according to an embodiment.

FIG. 15 illustrates a method 1500 for operating a mobile offshore drilling unit in case of an emergency. In step 1502, one or more electric thrusters are powered by one or more energy storage units. In one example of step 1502, one or more electric thrusters 116 are powered by energy storage units 106 (see, e.g., FIGS. 1-12 and 14). In step 1504, one or more additional drilling equipment loads are powered by one or more additional energy storage units. In one example of step 1504, kinetic energy subsystems 1421 power one or more additional drilling equipment loads represented by load 1419 (FIG. 14). In step 1506, station keeping is at least partially performed using electric thrusters. In one example of step 1506, one or more electric thrusters are controlled via a respective thruster electric power system (see, e.g., FIGS. 1-12 and 14) to at least substantially perform station keeping. In step 2508, the mobile offshore drilling unit is disconnected from a well being drilled by the mobile offshore drilling unit. Although FIG. 15 illustrates each step being performed in parallel, one or more of the steps of method 1500 could alternately be performed in series without departing from the scope hereof.

Changes may be made in the above systems and methods without departing from the scope hereof. For example, the electrical topologies of the featured systems and methods may be varied without departing from scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A thruster electric power system for a mobile offshore drilling unit, comprising: a
   thruster electric power bus;
   an additional electric power bus;
   an interface device electrically coupling the thruster electric power bus to the additional electric power bus;
   a thruster converter electrically coupling an electric thruster to the thruster electric power bus;
   an auxiliary electric power bus configured to receive electric power from the additional electric power bus;
   one or more energy storage units configured to power an electric thruster and the auxiliary electric power bus in response to one or more combustion generators of the mobile offshore drilling unit being unavailable to provide electric power to the electric thruster;
   a circuit breaker electrically coupling the additional electric power bus to a main electric power bus; and
   at least one combustion generator is electrically coupled to the main electric power bus.

2. The thruster electric power system of claim 1, wherein the one or more energy storage units comprise one or more kinetic generators.

3. The thruster electric power system of claim 1, wherein the one or more energy storage units comprise at least one of a battery storage subsystem and a supercapacitor.

4. The thruster electric power system of claim 1, wherein one or more auxiliary electric loads are electrically coupled to the auxiliary electric power bus.

5. The thruster electric power system of claim 4, wherein the one or more auxiliary electric loads comprise one or more of an oil pump, a cooling pump, and a hydraulic power unit.

6. The thruster electric power system of claim 1, wherein at least the thruster electric power bus, the one or more energy storage units, the additional power bus, the auxiliary electric power bus, and the thruster converter are housed in a common enclosure which does not contain a combustion generator.

7. The thruster electric power system of claim 1, wherein:
the interface device includes a first transformer; and
the auxiliary electric power bus is electrically coupled to the additional electric power bus via the first transformer.

8. The thruster electric power system of claim 1, wherein the one or more energy storage units are electrically coupled to the thruster electric power bus.

9. The thruster electric power system of claim 1, wherein the one or more energy storage units are electrically coupled to the electric thruster.

10. The thruster electric power system of claim 1, wherein the one or more energy storage units are electrically coupled to the additional electric power bus.

11. The thruster electric power system of claim 1, wherein each of the one or more energy storage units is capable of providing a power output to allow thruster operation at sufficient power and for a sufficient period of time to allow an emergency procedure to be performed and/or for power to be reinstated, such as a power output of at least 2.5 megawatts for 120 seconds.

12. A mobile offshore drilling unit comprising a thruster electric power system of claim 1.

13. The mobile offshore drilling unit of claim 12, further comprising a plurality of the one or more of the thruster electric power systems.

14. A method for operating a mobile offshore drilling unit according to claim 12 in case of an emergency, comprising:
powering one or more electric thrusters by one or more energy storage units; powering one or more additional drilling equipment loads by one or more additional energy storage units;
at least partially performing station keeping using the one or more electric thrusters; and
disconnecting the mobile offshore drilling unit from a well being drilled by the mobile offshore drilling unit.

15. A method for operating a mobile offshore drilling unit according to claim 13 in case of an emergency, comprising:
powering one or more electric thrusters by one or more energy storage units; powering one or more additional drilling equipment loads by one or more additional energy storage units;
at least partially performing station keeping using the one or more electric thrusters; and
disconnecting the mobile offshore drilling unit from a well being drilled by the mobile offshore drilling unit.

* * * * *